(12) United States Patent
Lee et al.

(10) Patent No.: US 12,258,432 B2
(45) Date of Patent: Mar. 25, 2025

(54) HYBRID SUPPORTED METALLOCENE CATALYST AND METHOD FOR PREPARING POLYPROPYLENE USING THE SAME

(71) Applicant: LG Chem, Ltd., Seoul (KR)

(72) Inventors: Sanghoon Lee, Daejeon (KR); Sangeun An, Daejeon (KR); Seok Hwan Kim, Daejeon (KR); Daesik Hong, Daejeon (KR); Donghyeon Gwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 846 days.

(21) Appl. No.: 17/438,185

(22) PCT Filed: Aug. 14, 2020

(86) PCT No.: PCT/KR2020/095104
§ 371 (c)(1),
(2) Date: Sep. 10, 2021

(87) PCT Pub. No.: WO2021/034170
PCT Pub. Date: Feb. 25, 2021

(65) Prior Publication Data
US 2022/0056163 A1 Feb. 24, 2022

(30) Foreign Application Priority Data

Aug. 16, 2019 (KR) .................. 10-2019-0100466
Aug. 13, 2020 (KR) .................. 10-2020-0102000

(51) Int. Cl.
*C08F 4/6592* (2006.01)
*C08F 2/38* (2006.01)
*C08F 4/646* (2006.01)
*C08F 110/06* (2006.01)

(52) U.S. Cl.
CPC ............. *C08F 4/6592* (2013.01); *C08F 2/38* (2013.01); *C08F 4/646* (2013.01); *C08F 110/06* (2013.01)

(58) Field of Classification Search
CPC . C08F 4/65904; C08F 4/65927; C08F 110/06
See application file for complete search history.

(56) References Cited

U.S. PATENT DOCUMENTS

| 2003/0195306 A1 | 10/2003 | Tsuie et al. |
| 2005/0010004 A1 | 1/2005 | Wang |
| 2006/0004156 A1 | 1/2006 | Chung |
| 2009/0017710 A1 | 1/2009 | Bugada et al. |
| 2016/0304639 A1 | 10/2016 | Bader et al. |
| 2018/0346618 A1 | 12/2018 | Bader et al. |
| 2019/0238916 A1 | 8/2019 | Chen et al. |

FOREIGN PATENT DOCUMENTS

| JP | 2019500473 A | 1/2019 |
| KR | 20080098637 A | 11/2008 |
| KR | 20150062004 A | 6/2015 |
| KR | 20160078290 A | 7/2016 |
| KR | 20160097254 A | 8/2016 |
| KR | 101773722 B1 | 8/2017 |

(Continued)

OTHER PUBLICATIONS

International Search Report for PCT/KR2020/095104 dated Dec. 1, 2020. 2 pgs.

(Continued)

*Primary Examiner* — Caixia Lu
(74) *Attorney, Agent, or Firm* — Lerner David LLP

(57) ABSTRACT

The hybrid supported metallocene catalyst according to the present disclosure comprises at least one first metallocene compound selected from compounds represented by the following Chemical Formula 1; and at least one second metallocene compound selected from compounds represented by the following Chemical Formula 3, and exhibits high activity in propylene polymerization and is useful for preparing polypropylene having high melt tension through the introduction of long chain branches (LCB) into polypropylene molecules, and a method for preparing a polypropylene using the same,

[Chemical Formula 1]

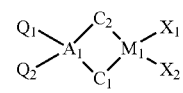

[Chemical Formula 3]

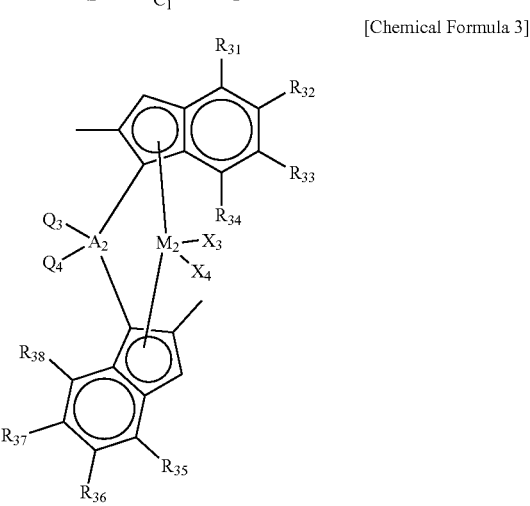

wherein all the variables are described herein.

17 Claims, No Drawings

(56) References Cited

FOREIGN PATENT DOCUMENTS

| KR | 20180051222 A | 5/2018 |
|----|---------------|--------|
| KR | 20180064114 A | 6/2018 |
| KR | 20180067945 A | 6/2018 |
| KR | 20190066896 A | 6/2019 |
| WO | 2018110915 A1 | 6/2018 |

OTHER PUBLICATIONS

Alexakis .A., et al., "Mild protection and deprotection of alcohols as ter-butyl ethers in the field of pheromone synthesis", Tetrahedron Letters, vol. 29, Issue 24 (1988), pp. 2951-2954.
Busico V and Cipullo R., Microstructure of Polypropylene. Progress in Polymer Science 26. (2001). 91 pgs.

HYBRID SUPPORTED METALLOCENE CATALYST AND METHOD FOR PREPARING POLYPROPYLENE USING THE SAME

CROSS-REFERENCE TO RELATED APPLICATIONS

The present application is a national stage entry under 35 U.S.C. § 371 of International Application No. PCT/KR2020/095104 filed on Aug. 14, 2020, which claims priority from Korean Patent Application No. 10-2019-0100466 filed on Aug. 16, 2019, and Korean Patent Application No. 10-2020-0102000 filed on Aug. 13, 2020, the disclosures of all of which are incorporated herein by reference.

TECHNICAL FIELD

The present disclosure relates to a hybrid supported metallocene catalyst and a method for preparing a polypropylene using the same.

BACKGROUND

Olefin polymerization catalyst systems may be divided into Ziegler-Natta and metallocene catalyst systems, and these two types of highly active catalyst systems have been developed in accordance with their characteristics.

The Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to secure desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, depending on the single site characteristics. The stereoregularity, copolymerization characteristics, such as molecular weight, crystallinity, and the like, of the resulting polymer may be controlled by changing a ligand structure of the catalyst and polymerization conditions.

Due to recent changes in environment-related awareness, many product groups seek to reduce the generation of volatile organic compounds (VOCs). However, in the case of a Ziegler-Natta catalyst (Z/N, ziegler-natta) used in the production of polypropylene, there is a problem that high total volatile organic compounds (TVOC) are generated. In particular, in the case of various polypropylenes products commercially available, to which Ziegler-Natta catalysts are applied constitute the mainstream, but recently, the conversion to products to which metallocene catalysts having low odor and exhibiting low elution characteristics are applied, is accelerating.

In particular, existing polypropylene is a general-purpose resin, and has the advantages of being light due to its low density, and having high rigidity and heat resistance, and low hygroscopicity, but has the disadvantages of being reduced in impact property and melt tension.

Therefore, there is a need to develop a method for preparing polypropylene that exhibits high activity in propylene polymerization using a metallocene catalyst and has a high melt tension through the introduction of long chain branches (LCB) into polypropylene molecules.

DETAILED DESCRIPTION OF THE INVENTION

Technical Problem

It is an object of the present disclosure to provide a hybrid supported metallocene catalyst which is useful for the preparation of polypropylene having a relatively high melt strength, along with excellent catalytic activity in propylene polymerization.

It is another object of the present disclosure to provide a method for preparing a polypropylene using the hybrid supported metallocene catalyst.

Technical Solution

According to the present disclosure, there is provided a hybrid supported metallocene catalyst comprising at least one first metallocene compound selected from compounds represented by the following Chemical Formula 1; at least one second metallocene compound selected from compounds represented by the following Chemical Formula 3; and a support for supporting the first and second metallocene compounds:

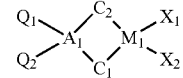

[Chemical Formula 1]

in Chemical Formula 1, $M_1$ is a Group 4 transition metal;

$A_1$ is carbon (C), silicon (Si), or germanium (Ge);

$Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{7-40}$ aryloxyalkyl, $C_{6-40}$ aryl, $C_{7-40}$ alkylaryl, or $C_{7-40}$ arylalkyl;

$X_1$ and $X_2$ are the same as or different from each other, and are each independently halogen, $C_{1-20}$ alkyl, $C_{2-20}$ alkenyl, $C_{6-40}$ aryl, a nitro group, an amido group, $C_{1-20}$ alkylsilyl, $C_{1-20}$ alkoxy, or $C_{1-20}$ sulfonate group;

$C_1$ and $C_2$ are the same as or different from each other, and are each independently represented by either the following Chemical Formula 2a or the following Chemical Formula 2b, provided that the case where both $C_1$ and $C_2$ are Chemical Formula 2b is excluded;

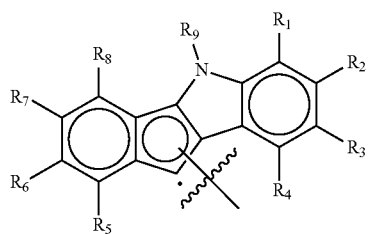

[Chemical Formula 2a]

[Chemical Formula 2b]

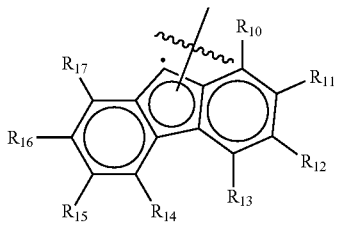

in Chemical Formulae 2a and 2b, $R_1$ to $R_{17}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-40}$ aryl, $C_{7-40}$ alkylaryl, or $C_{7-40}$ arylalkyl; or two or more neighboring groups of the $R_{10}$ to $R_{17}$ are connected to each other to form a substituted or unsubstituted aliphatic or aromatic ring;

⋅⟶ represents the site for binding to $A_1$; ⟶ represents the site for binding to $M_1$;

[Chemical Formula 3]

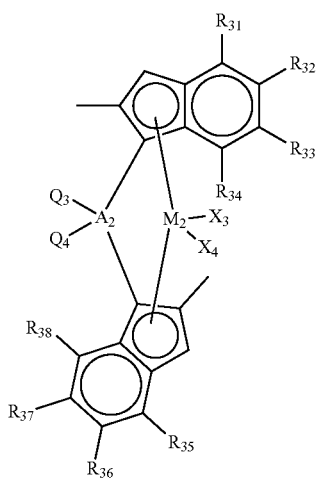

in Chemical Formula 3, $M_2$ is a Group 4 transition metal;

$A_2$ is carbon (C), silicon (Si), or germanium (Ge);

$X_3$ and $X_4$ are the same as or different from each other and are each independently halogen, $R_{31}$ and $R_{35}$ are the same as or different from each other, and are each independently $C_{6-40}$ aryl substituted with $C_{1-20}$ alkyl;

$R_{32}$ to $R_{34}$ and $R_{36}$ to $R_{38}$ are the same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-40}$ aryl, $C_{7-20}$ alkylaryl, or $C_{7-20}$ arylalkyl, and $Q_3$ and $Q_4$ are the same as each other and are $C_{2-20}$ alkyl.

In this case, the first metallocene compound may be selected from compounds represented by the following Chemical Formula 1-1 or Chemical Formula 1-2.

[Chemical Formula 1-1]

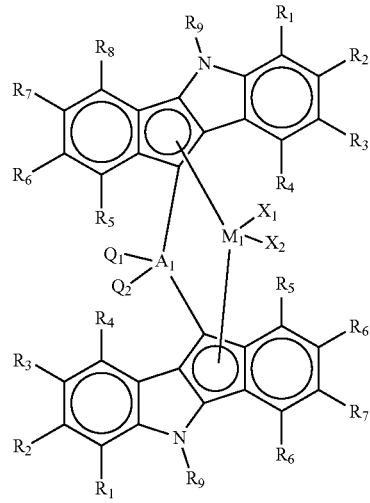

[Chemical Formula 1-2]

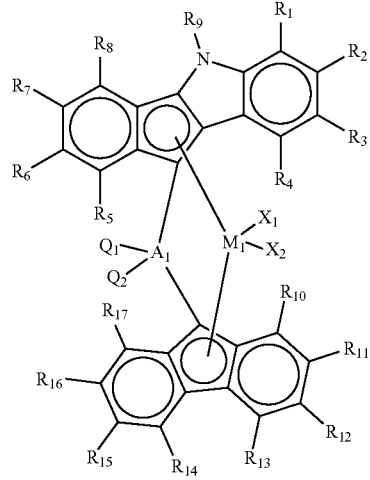

in Chemical Formulae 1-1 and 1-2, $Q_1$, $Q_2$, $A_1$, $M_1$, $X_1$, $X_2$, $R_1$ to $R_{17}$ are the same as those defined in relation to Chemical Formula 1.

Further, in Chemical Formula 1, $Q_1$ and $Q_2$ are each $C_{1-3}$ alkyl, or $C_{2-12}$ alkoxyalkyl, $X_1$ and $X_2$ are each halogen, $A_1$ is silicon (Si), and $M_1$ may be zirconium (Zr) or hafnium (Hf).

Further, in Chemical Formula 1, $R_1$ to $R_9$ may be each hydrogen, halogen, $C_{1-12}$ linear or branched alkyl, $C_{1-12}$ linear or branched alkoxy, or $C_{6-20}$ aryl.

Further, in Chemical Formula 1, $R_{10}$ to $R_{17}$ are each hydrogen, or $C_{1-12}$ linear or branched alkyl; or two or more neighboring groups of the $R_{10}$ to $R_{17}$ may be connected to each other to form a $C_{6-20}$ aliphatic or aromatic ring, which is substituted with at least one $C_{1-3}$ alkyl.

Further, the first metallocene compound may be represented by any one of the following structural formulas.

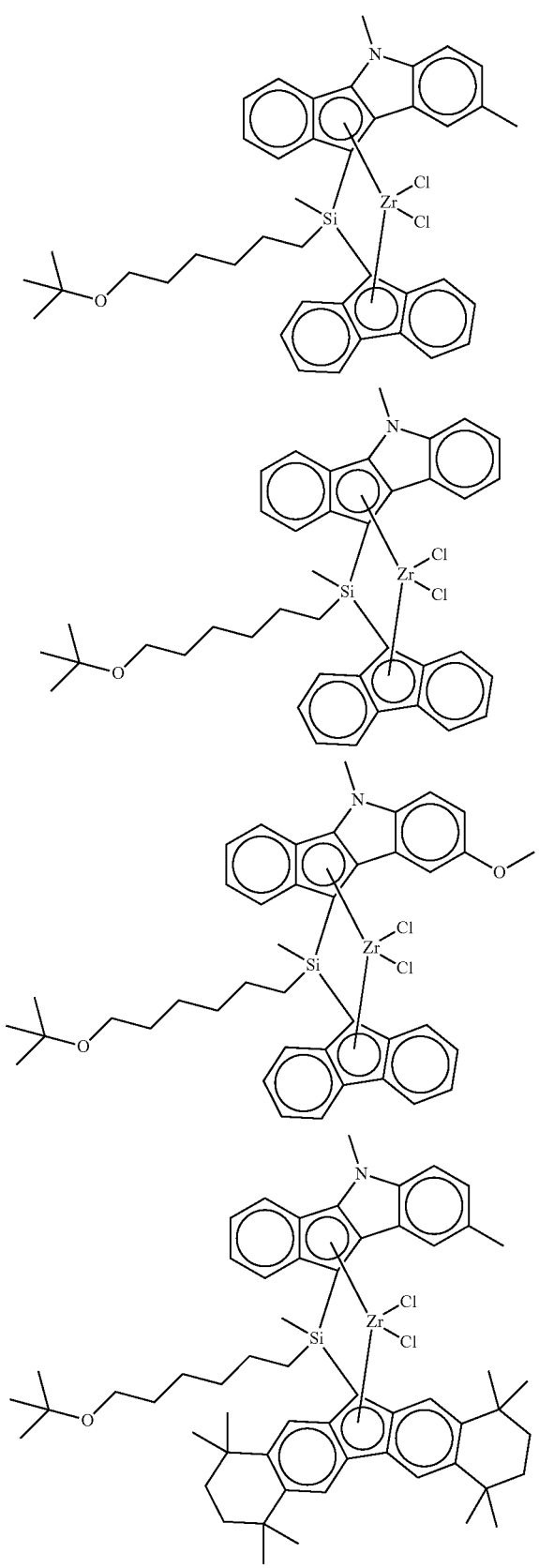
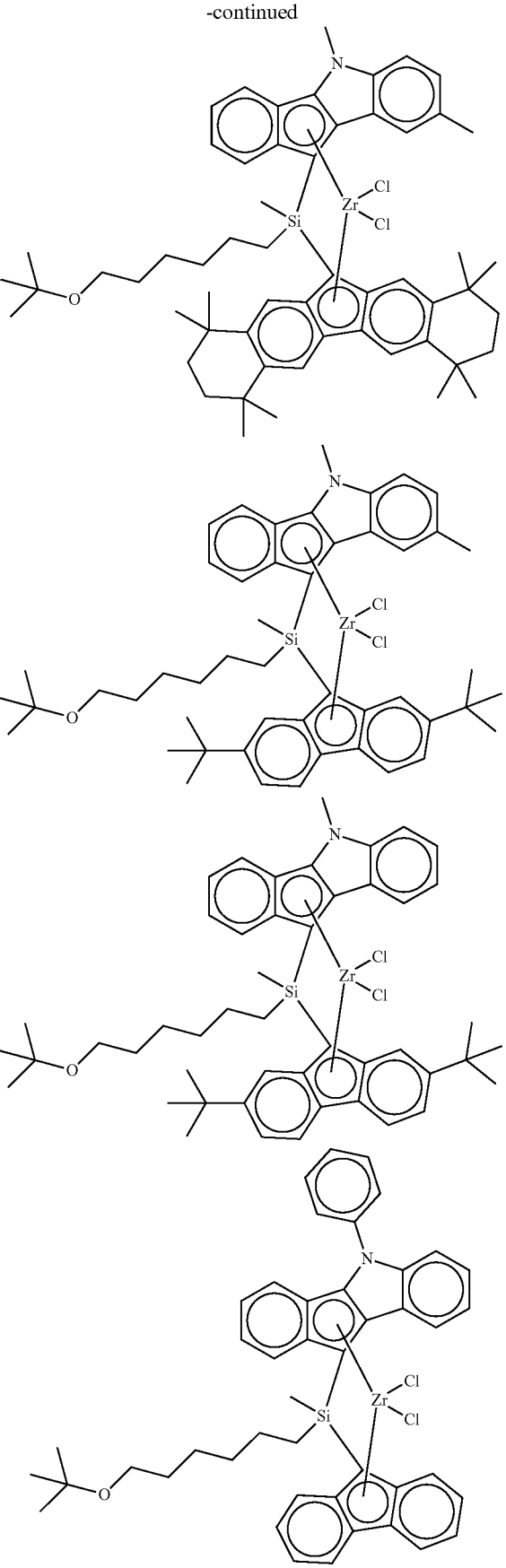

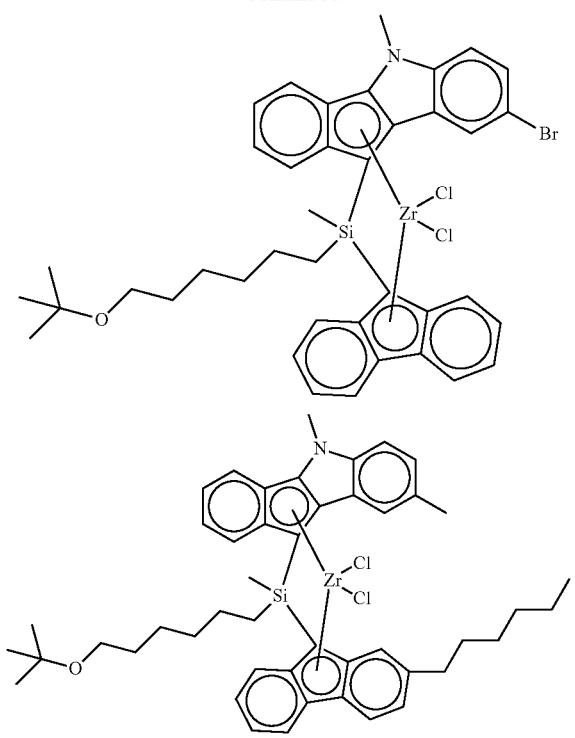

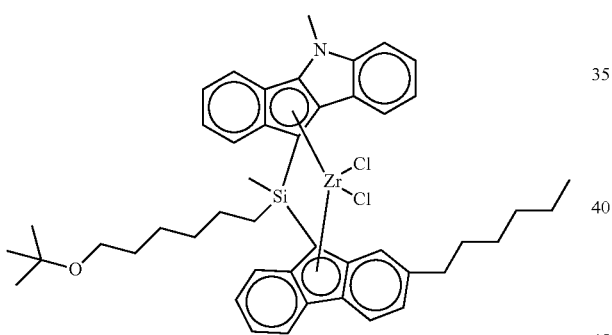

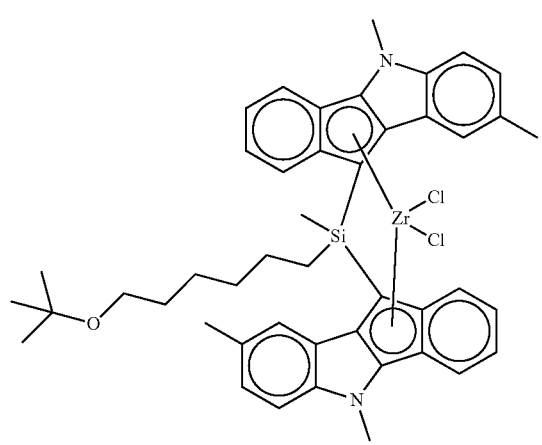

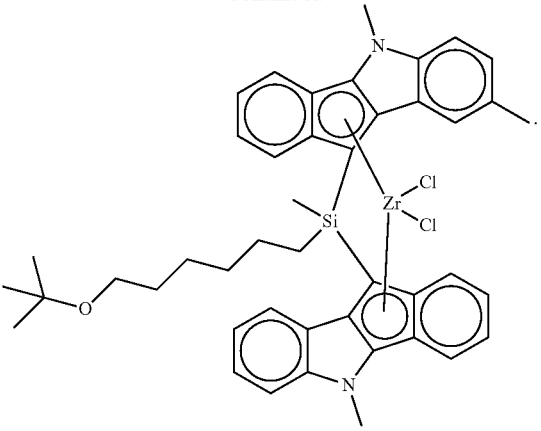

On the other hand, in Chemical Formula 3, $X_3$ and $X_4$ may be each halogen, $A_2$ may be silicon (Si), and $M_2$ may be zirconium (Zr) or hafnium (Hf).

And, in Chemical Formula 3, $R_{31}$ and $R_{35}$ may be each a phenyl group substituted with $C_{3-6}$ branched alkyl group, preferably tert-butyl phenyl.

And, in Chemical Formula 3, $Q_3$ and $Q_4$ are the same and may be $C_{2-4}$ linear alkyl group, preferably ethyl.

And, in Chemical Formula 3, the second metallocene compound may be a compound represented by the following structural formula.

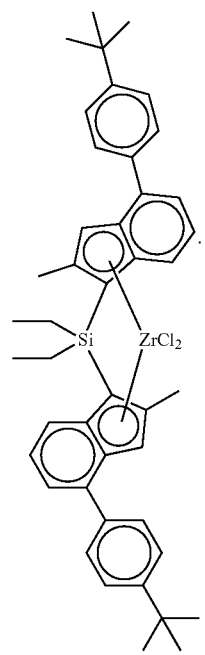

Further, the first metallocene compound and the second metallocene compound may be supported in a molar ratio of 1:1 to 1:8 based on 1 g of the support.

Further, the support may contain a hydroxyl group and a siloxane group on the surface, and preferably, it may be at least one selected from the group consisting of silica, silica-alumina and silica-magnesia.

Further, the hybrid supported metallocene catalyst of the present disclosure may further include at least one cocatalyst selected from the group consisting of compounds represented by the following Chemical Formulas 4 to 6.

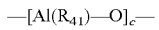  [Chemical Formula 4]

in Chemical Formula 4,
each $R_{41}$ is independently halogen, $C_{1-20}$ alkyl or $C_{1-20}$ haloalkyl, and
c is an integer of 2 or more,

  [Chemical Formula 5]

in Chemical Formula 5,
D is aluminum or boron,
each $R_{51}$ is independently hydrogen, halogen, $C_{1-20}$ hydrocarbyl or a halogen-substituted $C_{1-20}$ hydrocarbyl,

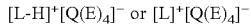  [Chemical Formula 6]

in Chemical Formula 6,
L is a neutral or cationic Lewis base,
$[L\text{-}H]^+$ is a Bronsted (Brönsted) acid,
Q is $B^{3+}$ or $Al^{3+}$,
each E is independently $C_{6-40}$ aryl or $C_{1-20}$ alkyl, wherein the $C_{6-40}$ aryl or $C_{1-20}$ alkyl is unsubstituted or substituted one or more substituents selected from the group consisting of halogen, $C_{1-20}$ alkyl, $C_{1-20}$ alkoxy, and $C_{6-40}$ aryloxy.

On the other hand, the present disclosure provides a method for preparing polypropylene, comprising a step of polymerizing a propylene monomer in the presence of the above-mentioned hybrid supported metallocene catalyst.

In this case, the polypropylene may be a homopolymer, and the polypropylene may have a pentad sequence distribution measured by $^{13}$C-NMR analysis of 65 mmmm % or more, and a melt strength (MS) of 15 cN or more.

The terms used herein are used only to describe specific exemplary embodiments, and are not intended to limit the scope of the present disclosure.

A singular expression includes a plural expression unless they have definitely opposite meanings in the context.

It should be understood that the terms "comprise", "include", and "have" as used herein are intended to designate the presence of stated features, numbers, steps, constitutional elements, or combinations thereof, but they do not preclude the possibility of existence or addition of one or more other features, numbers, steps, constitutional elements, or combinations thereof.

Also, as used herein, in case a layer or an element is mentioned to be formed "on" or "above" layers or elements, it means that the layer or element is directly formed on the layers or elements, or it means that other layers or elements may be additionally formed between the layers, on a subject, or on a substrate.

Although the present disclosure may have various forms and various modifications may be made thereto, specific embodiments will be exemplified and explained in detail. However, it is not intended to limit the present disclosure to a specific disclosed form, and it should be understood that all the modifications, equivalents or substitutions within the idea and technical scope of the present disclosure are included in the present disclosure.

Hereinafter, the present disclosure will be described in detail.

According to one aspect of the present disclosure, there is provided a hybrid supported metallocene catalyst comprising at least one first metallocene compound selected from compounds represented by the following Chemical Formula 1; at least one second metallocene compound selected from compounds represented by the following Chemical Formula 3; and a support for supporting the first and second metallocene compounds;

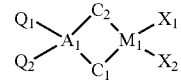  [Chemical Formula 1]

in Chemical Formula 1,
$M_1$ is a Group 4 transition metal;
$A_1$ is carbon (C), silicon (Si), or germanium (Ge);
$Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{7-40}$ aryloxyalkyl, $C_{6-40}$ aryl, $C_{7-40}$ alkylaryl, or $C_{7-40}$ arylalkyl;
$X_1$ and $X_2$ are the same as or different from each other, and are each independently halogen, $C_{1-20}$ alkyl, $C_{2-20}$ alkenyl, $C_{6-40}$ aryl, a nitro group, an amido group, $C_{1-20}$ alkylsilyl, $C_{1-20}$ alkoxy, or $C_{1-20}$ sulfonate group;
$C_1$ and $C_2$ are the same as or different from each other, and are each independently represented by either the following Chemical Formula 2a or the following Chemical Formula 2b, provided that the case where both $C_1$ and $C_2$ are Chemical Formula 2b is excluded;

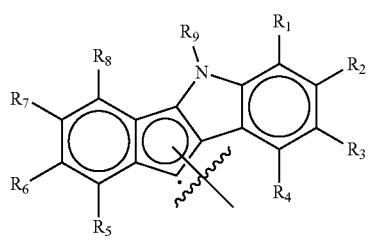  [Chemical Formula 2a]

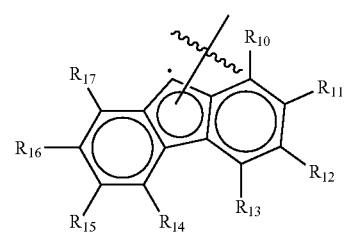  [Chemical Formula 2b]

in Chemical Formulae 2a and 2b,
$R_1$ to $R_{17}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-40}$ aryl, $C_{7-40}$ alkylaryl, or $C_{7-40}$ arylalkyl; or two or more neighboring groups of the $R_{10}$ to $R_{17}$ are connected to each other to form a substituted or unsubstituted aliphatic or aromatic ring;

·represents the site for binding to $A_1$; ⸺⧘⸺ represents the site for binding to $M_1$;

[Chemical Formula 3]

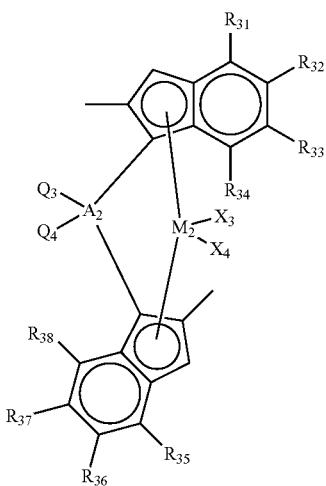

in Chemical Formula 3, $M_2$ is a Group 4 transition metal;

$A_2$ is carbon (C), silicon (Si), or germanium (Ge);

$X_3$ and $X_4$ are the same as or different from each other, and are each independently halogen, $R_{31}$ and $R_{35}$ are the same as or different from each other, and are each independently $C_{6-40}$ aryl substituted with $C_{1-20}$ alkyl;

$R_{32}$ to $R_{34}$ and $R_{36}$ to $R_{38}$ are the same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-40}$ aryl, $C_{7-20}$ alkylaryl, or $C_{7-20}$ arylalkyl, $Q_3$ and $Q_4$ are the same as each other and are $C_{2-20}$ alkyl.

Unless otherwise stated herein, the following terms may be defined as follows.

The halogen may be fluorine (F), chlorine ($C_1$), bromine (Br), or iodine (I).

The alkyl having 1 to 20 carbon atoms ($C_{1-20}$) can be a linear, branched or cyclic alkyl. Specifically, the alkyl having 1 to 20 carbon atoms may include a linear alkyl having 1 to 20 carbon atoms; a linear alkyl having 1 to 15 carbon atoms; a linear alkyl having 1 to 5 carbon atoms; a branched or cyclic alkyl having 3 to 20 carbon atoms; a branched or cyclic alkyl having 3 to 15 carbon atoms; or a branched or cyclic alkyl having 3 to 10 carbon atoms. As an example, the alkyl having 1 to 20 carbon atoms ($C_{1-20}$) may include methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, or the like, but is not limited thereto.

The alkenyl having 2 to 20 carbon atoms ($C_{2-20}$) may include a linear or branched alkenyl, and specifically, it may include allyl, ethenyl, propenyl, butenyl, pentenyl, or the like, but is not limited thereto.

The alkoxy having 1 to 20 carbon atoms ($C_{1-20}$) may include a methoxy group, ethoxy, isopropoxy, n-butoxy, tert-butoxy, cyclohexyloxy, or the like, but is not limited thereto.

The alkoxyalkyl group having 2 to 20 carbon atoms ($C_{2-20}$) is a functional group in which one or more hydrogens of the aforementioned alkyl are substituted with an alkoxy, and specifically, it may include alkoxyalkyl such as methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, tert-butoxyhexyl, but is not limited thereto.

The aryloxy having 6 to 40 carbon atoms ($C_{6-40}$) may include phenoxy, biphenoxyl, naphthoxy, or the like, but is not limited thereto.

The aryloxyalkyl group having 7 to 40 carbon atoms ($C_{7-40}$) is a functional group in which one or more hydrogens of the aforementioned alkyl are substituted with an aryloxy, and specifically, it may include phenoxymethyl, phenoxyethyl, phenoxyhexyl, or the like, but is not limited thereto.

The alkylsilyl having 1 to 20 carbon atoms ($C_{1-20}$) or the alkoxysilyl group having 1 to 20 carbon atoms ($C_{1-20}$) is a functional group in which 1 to 3 hydrogens of $—SiH_3$ are substituted with 1 to 3 alkyl or alkoxy as described above, and specifically, it may include alkylsilyl, such as methylsilyl, dimethylsilyl, trimethylsilyl, dimethylethylsilyl, diethylmethylsilyl group, or dimethylpropylsilyl; alkoxysilyl such as methoxysilyl, dimethoxysilyl, trimethoxysilyl or dimethoxyethoxysilyl; alkoxyalkylsilyl such as methoxydimethylsilyl, diethoxymethylsilyl or dimethoxypropylsilyl, but is not limited thereto.

The silylalkyl having 1 to 20 carbon atoms ($C_{1-20}$) is a functional group in which one or more hydrogens of the alkyl as described above are substituted with silyl, and specifically, it may include $—CH_2—SiH_3$, methylsilylmethyl, dimethylethoxysilylpropyl, or the like, but is not limited thereto.

Further, the alkylene having 1 to 20 carbon atoms ($C_{1-20}$) is the same as the above-mentioned alkyl except that it is a divalent substituent, and specifically, it may include methylene, ethylene, propylene, butylene, pentylene, hexylene, heptylene, octylene, cyclopropylene, cyclobutylene, cyclopentylene, cyclohexylene, cycloheptylene, cyclooctylene, or the like, but is not limited thereto.

The aryl having 6 to 20 carbon atoms ($C_{6-20}$) may be a monocyclic, bicyclic or tricyclic aromatic hydrocarbon. As one example, the aryl having 6 to 20 carbon atoms ($C_{6-20}$) may include phenyl, biphenyl, naphthyl, anthracenyl, phenanthrenyl, fluorenyl, or the like, but is not limited thereto.

The alkylaryl having 7 to 20 carbon atoms ($C_{7-20}$) may mean a substituent in which one or more hydrogens among hydrogens of an aromatic ring are substituted with the aforementioned alkyl. As an example, the alkylaryl having 7 to 20 carbon atoms ($C_{7-20}$) may include methylphenyl, ethylphenyl, methylbiphenyl, methylnaphthyl, or the like, but is not limited to thereto.

The arylalkyl having 7 to 20 carbon atoms ($C_{7-20}$) may mean a substituent in which one or more hydrogens of the aforementioned alkyl are substituted with the aforementioned aryl. As an example, the arylalkyl having 7 to 20 carbon atoms ($C_{7-20}$) may include phenylmethyl, phenylethyl, biphenylmethyl, naphthylmethyl, or the like, but is not limited thereto.

Further, the arylene having 6 to 20 carbon atoms ($C_{6-20}$) is the same as the aforementioned aryl except that it is a divalent substituent, and specifically, it may include phenylene, biphenylene, naphthylene, anthracenylene, phenanthrenylene, fluorenylene, or the like, but is not limited thereto.

Further, the Group 4 transition metal may be titanium (Ti), zirconium (Zr), hafnium (Hf), or rutherfordium (Rf), and specifically, it may be titanium (Ti), zirconium (Zr), or hafnium (Hf), and more specifically, zirconium (Zr) or hafnium (Hf), but is not limited thereto.

Further, the Group 13 element may be boron (B), aluminum (Al), gallium (Ga), indium (In), or thallium (Tl), and specifically, it may be boron (B) or aluminum (Al), but is not limited thereto.

The above-mentioned substituents may be optionally substituted with one or more substituents selected from the group consisting of a hydroxyl group; a halogen; an alkyl or alkenyl, aryl, alkoxy; an alkyl or alkenyl, aryl, alkoxy containing one or more heteroatoms among heteroatoms of Groups 14 to 16; silyl; alkylsilyl or alkoxysilyl; a phosphine group; a phosphide group; a sulfonate group; and a sulfonic group within the range that exhibits the same or similar effect as the intended effect.

On the other hand, the hybrid supported catalyst of the present disclosure hybrid-supports a first metallocene compound forming a double bond at the terminal and a second metallocene compound having a high molecular weight characteristic during propylene polymerization, thus exhibiting high activity in propylene polymerization, and also has a feature useful for the preparation of polypropylene having a high melt tension by introducing long chain branches (LCB) into polypropylene molecules.

Specifically, the first metallocene compound of Chemical Formula 1 forms a structure in which an indeno indole derivative and one of an indeno indole derivative or a fluorene derivative are crosslinked by a bridge group. Thus, in the first metallocene compound, such a bulky group can provide an appropriate steric hindrance to obtain a reaction control effect. Further, since the indenoindole ligand structure has an unshared electron pair of a hetero atom, namely, nitrogen, such a bulky group can stabilize the vacant site of the transition metal contained in the bridge group. Thereby, the compound can induce beta-hydride elimination of the polymer chain to form a macromer having a double bond at the terminal of the polymer chain, and then to introduce long chain branches (LCB) into polypropylene molecules.

Further, the second metallocene compound represented by Chemical Formula 3 includes a divalent functional group $A_2$ bi-substituted with the same alkyl group having 2 or more carbon atoms as a bridge group connecting two ligands including an indenyl group, and thus has a larger atomic size than a conventional carbon bridge, so that the monomer is readily accessible as the usable angle increases, thereby exhibiting more excellent catalytic activity. In particular, since the second metallocene compound represented by Chemical Formula 3 has excellent stereoregularity than the first metallocene compound represented by Chemical Formula 1, it is suitable for propylene polymerization, has excellent catalytic activity, and thus can play a role in polymerizing polymer chains having a high molecular weight.

Therefore, the hybrid supported metallocene catalyst further includes the second metallocene compound in addition to the first metallocene compound, that is, contains at least two or more different types of metallocene compounds, so that it exhibits a high activity in polymerization of propylene and can prepare polypropylene with excellent physical properties, especially improved melt tension through the introduction of long chain branches (LCB) into polypropylene molecules.

Specifically, the first metallocene compound of Chemical Formula 1 may be selected from compounds represented by the following Chemical Formula 1-1 or Chemical Formula 1-2.

[Chemical Formula 1-1]

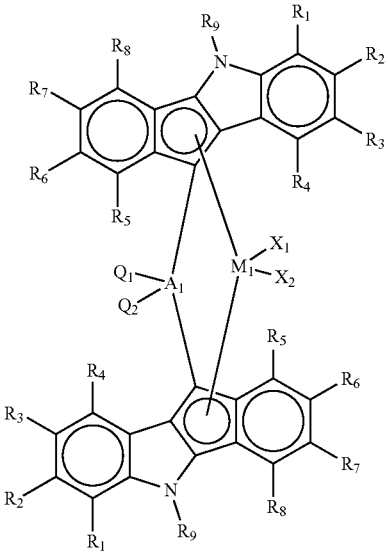

[Chemical Formula 1-2]

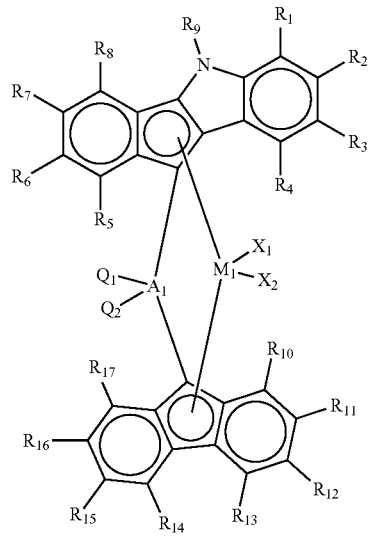

in Chemical Formulas 1-1 and 1-2, $Q_1$, $Q_2$, $A_1$, $M_1$, $X_1$, $X_2$, and $R_1$ to $R_{17}$ are the same as those defined in relation to Chemical Formula 1.

Further, in Chemical Formula 1, $Q_1$ and $Q_2$ is each $C_{1-3}$ alkyl, or $C_{2-12}$ alkoxyalkyl, and preferably, each may be methyl or t-butoxyhexyl.

Further, $X_1$ and $X_2$ may be each halogen, preferably chlorine.

Further, $A_1$ may be silicon (Si).

Further, $M_1$ may be zirconium (Zr) or hafnium (Hf), preferably zirconium (Zr).

Further, in Chemical Formula 1, $R_1$ to $R_9$ may be each hydrogen, halogen, $C_{1-12}$ linear or branched alkyl, $C_{1-12}$ linear or branched alkoxy, or $C_{6-20}$ aryl.

Specifically, $R_3$ may be hydrogen; a halogen; $C_{1-6}$ linear or branched alkyl, or $C_{1-3}$ linear or branched alkyl; or $C_{1-6}$ linear or branched alkoxy, or $C_{1-3}$ linear or branched alkoxy. Preferably, $R_3$ may be hydrogen, bromine, methyl, or methoxy. And, $R_9$ may be $C_{1-6}$ linear or branched alkyl, or $C_{1-3}$ linear or branched alkyl; or $C_{6-20}$ aryl, or $C_{6-12}$ aryl.

Preferably, $R_9$ may be methyl or phenyl. In addition, the remaining $R_1$, $R_2$, $R_4$ to $R_8$ may be hydrogen.

Further, in Chemical Formula 1, $R_{10}$ to $R_{17}$ are each hydrogen; $C_{1-12}$ linear or branched alkyl, or $C_{1-6}$ linear or branched alkyl, and preferably, may be hydrogen, methyl, ethyl, propyl, n-butyl, t-butyl, pentyl, or hexyl, or alternatively, may be hydrogen, t-butyl, or hexyl.

Alternatively, in Chemical Formula 1, two or more neighboring groups of the $R_{10}$ to $R_{17}$ may be connected to each other to form $C_{6-20}$ aliphatic or aromatic ring wherein at least one $C_{1-3}$ alkyl is substituted. Specifically, the $R_{11}$, $R_{12}$ and $R_{15}$, $R_{16}$ may be connected to each other to form $C_{6-12}$ aliphatic or aromatic ring substituted with at least one $C_{1-3}$ alkyl. In one example, two or more neighboring groups of the $R_{10}$ to $R_{17}$ may be connected to each other to form $C_{6-12}$ aliphatic or aromatic ring, preferably cyclohexyl or phenyl. Further, the aliphatic or aromatic ring may be substituted with at least one or about 1 to about 8 or about 1 to about 4 of the $C_{1-3}$ alkyl. At this time, the $C_{1-3}$ alkyl may be methyl, ethyl, or propyl, preferably methyl.

Specifically, the first metallocene compound may be a compound represented by any one of the following Chemical Formulas 1-3 to 1-5.

[Chemical Formula 1-3]

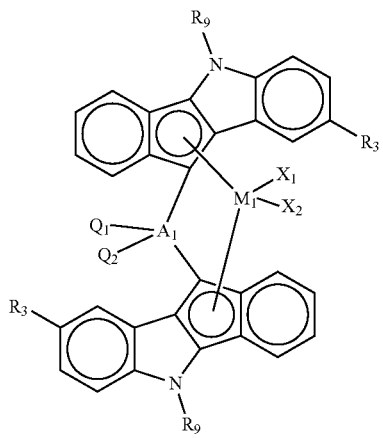

[Chemical Formula 1-4]

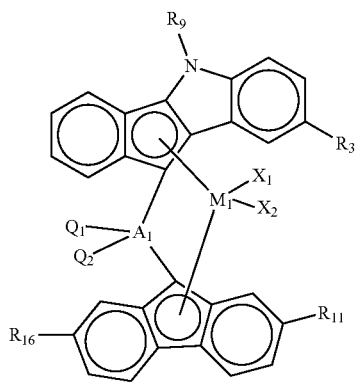

[Chemical Formula 1-5]

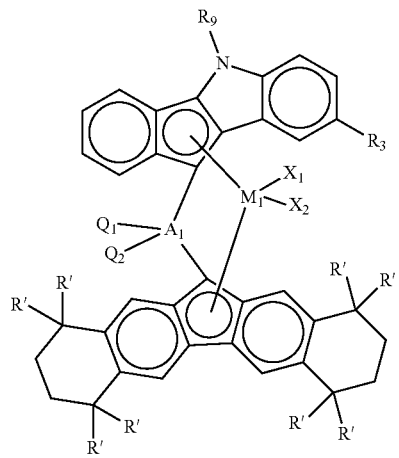

in Chemical Formulas 1-3 to 1-5, $Q_1$, $Q_2$, $A_1$, $M_1$, $X_1$, $X_2$, $R_3$, $R_9$, $R_{11}$, and $R_{16}$ are the same as those defined in relation to Chemical Formula 1, R' may be $C_{1-3}$ alkyl, specifically, methyl, ethyl, or propyl, and preferably methyl.

In addition, the first metallocene compound may be represented by one of the following structural formulas.

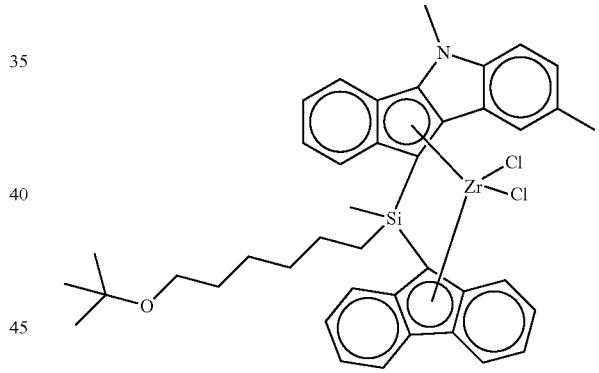

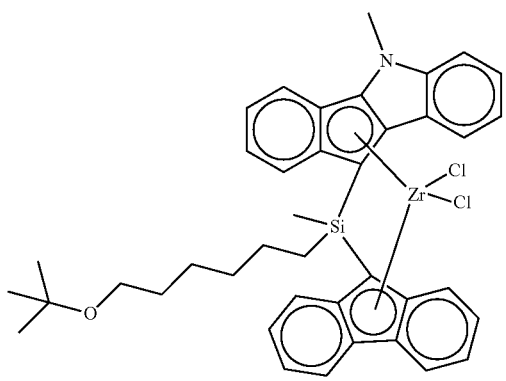

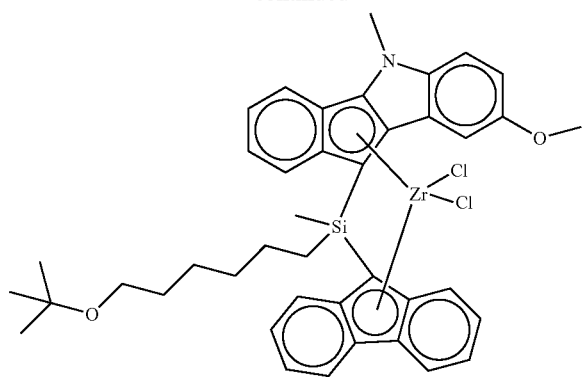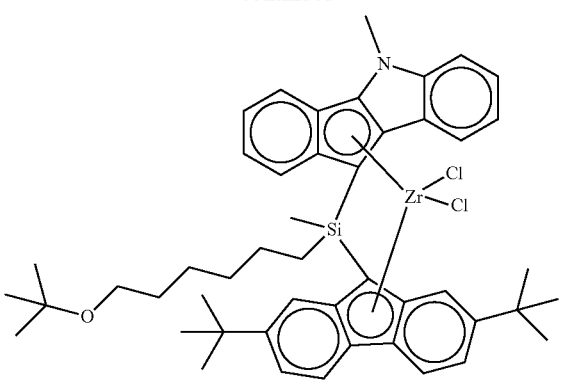

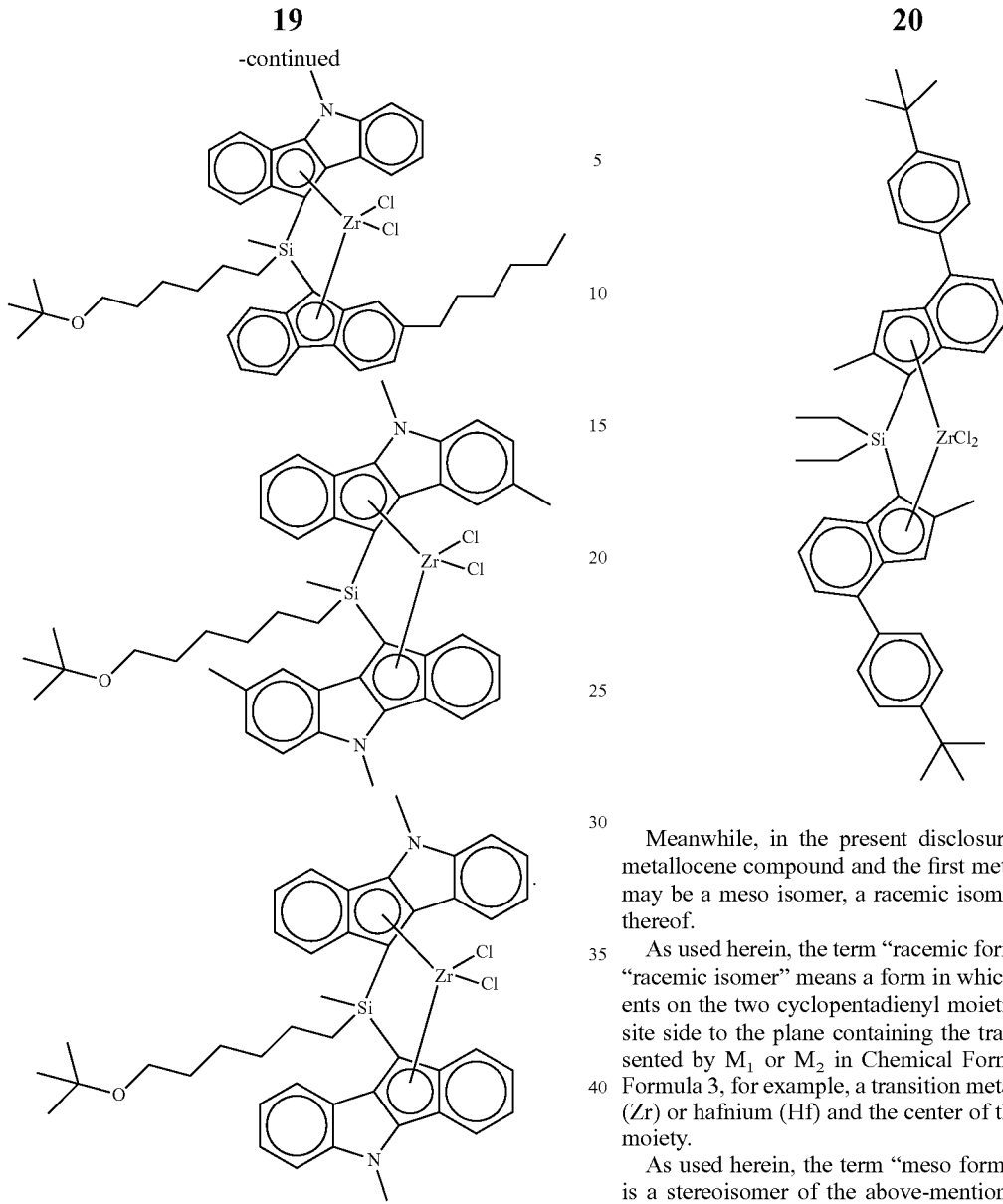

Meanwhile, the hybrid supported metallocene catalyst of the present disclosure includes at least one second metallocene compound selected from the compounds represented by Chemical Formula 3 together with at least one first metallocene compound as described above.

Specifically, in Chemical Formula 3, $X_3$ and $X_4$ are each halogen, and preferably chlorine.

Further, $A_2$ may be silicon (Si).

Further, $M_2$ may be zirconium (Zr) or hafnium (Hf), preferably zirconium (Zr).

Further, in Chemical Formula 3, the $R_{31}$ and $R_{35}$ may be each a phenyl group substituted with $C_{3-6}$ branched alkyl group, preferably tert-butyl phenyl.

Further, in Chemical Formula 3, $Q_3$ and $Q_4$ may be the same as each other, and may be $C_{2-4}$ linear alkyl group, preferably ethyl.

Specifically, in Chemical Formula 3, the second metallocene compound may include a compound represented by the following structural formula, but is not limited thereto.

Meanwhile, in the present disclosure, each of the first metallocene compound and the first metallocene compound may be a meso isomer, a racemic isomer, or a mixed form thereof.

As used herein, the term "racemic form" or "racemate" or "racemic isomer" means a form in which the same substituents on the two cyclopentadienyl moieties are on the opposite side to the plane containing the transition metal represented by $M_1$ or $M_2$ in Chemical Formula 1 or Chemical Formula 3, for example, a transition metal such as zirconium (Zr) or hafnium (Hf) and the center of the cyclopentadienyl moiety.

As used herein, the term "meso form" or "meso isomer" is a stereoisomer of the above-mentioned racemic isomer, and means a form in which the same substituents on the two cyclopentadienyl moieties are on the same side to the plane containing the transition metal represented by $M_1$ or $M_2$ in Chemical Formula 1 or Chemical Formula 3, for example, a transition metal such as zirconium (Zr) or hafnium (Hf) and the center of the cyclopentadienyl moiety.

In the hybrid supported metallocene catalyst of the present disclosure, the first metallocene compound and the second metallocene compound may be supported in a molar ratio of 1:1 to 1:8. When the supporting ratio is less than 1:1, only the first metallocene compound plays a leading role, the stereoregularity at the time of propylene polymerization is remarkably deteriorated, it becomes highly sticky, which can make the polymer formation itself difficult. In addition, when the supporting ratio exceeds 1:8, only the second metallocene compound plays a leading role, the content of long chain branch (LCB) in the polypropylene molecule is reduced, and thus the melt tension may be lowered.

Specifically, a hybrid supported metallocene catalyst, in which the first metallocene compound and the second metallocene compound are supported in a molar ratio of about 1:1.5 to about 1:6, or a molar ratio of about 1:2 to about 1:5, exhibits a high activity in propylene polymerization, and is desirable because it can prepare polypropylene with excellent physical properties, particularly improved melt tension, through the introduction of long chain branches (LCB) into polypropylene molecules.

That is, in the case of the hybrid supported metallocene catalyst of the present disclosure in which the first metallocene compound and the second metallocene compound are supported in the above molar ratio, the melt tension of polypropylene can be further improved due to the interaction of two or more catalysts.

In the hybrid supported metallocene catalyst of the present disclosure, a support containing a hydroxyl group on the surface may be used as a support for supporting the first metallocene compound and the second metallocene compound, and preferably, it may contain a hydroxyl group and a siloxane group having high reactivity on the surface, which is dried to remove water on the surface.

For example, silica, silica-alumina, silica-magnesia, and the like dried at high temperature may be used, and they may typically contain an oxide, a carbonate, a sulfate, and a nitrate component, such as $Na_2O$, $K_2CO_3$, $BaSO_4$, or $Mg(NO_3)_2$.

The drying temperature of the support is preferably about 200° C. to about 800° C., more preferably about 300° C. to about 600° C., and most preferably about 300° C. to about 400° C. When the drying temperature of the support is less than 200° C., it has water too much so that the water on the surface reacts with a cocatalyst described later. In addition, when the drying temperature of the support is too low as described above, the supporting rate of the cocatalyst may be relatively high due to the excessive presence of the hydroxyl group, which will require a large amount of cocatalyst. On the other hand, when the drying temperature of the support exceeds 800° C., the surface area is reduced while pores on the surface of the support are aligned. Further, many hydroxyl groups are lost on the surface, and only siloxane remains, thereby decreasing reaction site with the cocatalyst, which is not preferable.

The amount of a hydroxyl group on the surface of the support is preferably about 0.1 mmol/g to about 10 mmol/g, and more preferably about 0.5 mmol/g to about 5 mmol/g. The amount of a hydroxyl group on the surface of the support can be adjusted by the method and conditions for producing the support or drying conditions, such as temperature, time, vacuum or spray drying, and the like.

When the amount of the hydroxyl group is less than about 0.1 mmol/g, the reaction site with the cocatalyst is small. When the amount of the hydroxyl group exceeds about 10 mmol/g, it may be caused by water other than the hydroxyl group present on the surface of the support particle, which is not preferable.

Further, the hybrid supported metallocene catalyst may be one in which at least one first metallocene compound and at least one second metallocene compound are supported on a support together with a cocatalyst compound. The cocatalyst can be used without limitation as long as it is a cocatalyst used at the time of polymerizing olefins under a general metallocene catalyst. This cocatalyst allows a bond to be formed between the hydroxyl group on the support and the Group 13 transition metal. In addition, the cocatalyst is present only on the surface of the support, and thus, it can contribute to securing the unique properties possessed by the specific hybrid catalyst configuration of the present disclosure, without a fouling phenomenon in which the polymer particles are entangled with each other or on the walls of the reactor.

Specifically, the hybrid supported metallocene catalyst may further include at least one cocatalyst selected from the group consisting of compounds represented by the following Chemical Formulas 4 to 6:

$$—[Al(R_{41})—O]_c—$$ [Chemical Formula 4]

in Chemical Formula 4,
each $R_{41}$ is independently halogen, $C_{1-20}$ alkyl or $C_{1-20}$ haloalkyl, and
c is an integer of 2 or more, $$D(R_{51})_3$$ [Chemical Formula 5]

in Chemical Formula 5,
D is aluminum or boron,
each $R_{51}$ is independently hydrogen, halogen, $C_{1-20}$ hydrocarbyl or a halogen-substituted $C_{1-20}$ hydrocarbyl, $$[L-H]^+[Q(E)_4]^- \text{ or } [L]^+[Q(E)_4]^-$$ [Chemical Formula 6]

in Chemical Formula 6,
L is a neutral or cationic Lewis base,
$[L-H]^+$ is a Bronsted (Brönsted) acid,
Q is $B^{3+}$ or $Al^{3+}$,
each E is independently $C_{6-40}$ aryl or $C_{1-20}$ alkyl, wherein the $C_{6-40}$ aryl or the $C_{1-20}$ alkyl is unsubstituted or substituted one or more substituents selected from the group consisting of halogen, $C_{1-20}$ alkyl, $C_{1-20}$ alkoxy, and $C_{6-40}$ aryloxy.

The compound represented by Chemical Formula 4 may be, for example, an alkylaluminoxane such as modified methylaluminoxane (MMAO), methylaluminoxane (MAO), ethyl aluminoxane, isobutyl aluminoxane, butylaluminoxane, and the like.

The alkyl metal compound represented by Chemical Formula 5 may be, for example, trimethylaluminum, triethyl aluminum, triisobutyl aluminum, tripropyl aluminum, tributyl aluminum, dimethylchloroaluminum, dimethylisobutylaluminum, dimethylethylaluminum, diethylchloroaluminum, triisopropyl aluminum, tri-s-butyl aluminum, tricyclopentyl aluminum, tripentyl aluminum, triisopentyl aluminum, trihexyl aluminum, ethyl dimethyl aluminum, methyl diethyl aluminum, triphenyl aluminum, tri-p-tolyl aluminum, dimethyl aluminum methoxide, dimethyl aluminum ethoxide, trimethylboron, triethylboron, triisobutylboron, tripropyl boron, tributyl boron, and the like.

The compound represented by Chemical Formula 6 may include, for example, triethylammoniumtetraphenylboron, tributylammoniumtetraphenylboron, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, triphenylcarboniumtetraphenylboron, triphenylcarboniumtetraphenylaluminum, triphenylcarboniumtetra(p-trifluoromethylphenyl)boron, triphenylcarboniumtetrapentafluorophenylboron, and the like.

Further, the hybrid supported metallocene catalyst may include the cocatalyst and the first metallocene compound in a molar ratio of about 1:1 to about 1:10000, preferably in a molar ratio of about 1:1 to about 1:1000 and more preferably in a molar ratio of about 1:10 to about 1:100.

Further, the hybrid supported metallocene catalyst may also include the cocatalyst and the second metallocene compound in a molar ratio of about 1:1 to about 1:10000, preferably in a molar ratio of about 1:1 to about 1:1000, and more preferably in a molar ratio of about 1:10 to about 1:100.

At this time, when the molar ratio is less than about 1, the metal content of the cocatalyst is too low to well form the catalytically active species, so the activity may be reduced. When the molar ratio exceeds about 10000, the metal of the cocatalyst may rather function as a catalytic poison.

The supporting amount of the cocatalyst may be from about 5 mmol to about 20 mmol based on 1 g of the support.

On the other hand, the hybrid supported metallocene catalyst can be prepared by a preparation method which comprises: a step of supporting a cocatalyst on a support; a step of supporting a first metallocene compound on the support on which the cocatalyst is supported; and a step of supporting a second metallocene compound on the support on which the cocatalyst and the first metallocene compound are supported.

Alternatively, the hybrid supported metallocene catalyst can be prepared by a preparation method which comprises a step of supporting a cocatalyst on a support; a step of supporting a second metallocene compound on the support on which the cocatalyst is supported; and a step of supporting the first metallocene compound on the support on which the cocatalyst and the second metallocene compound are supported.

Further alternatively, the hybrid supported metallocene catalyst can be prepared by a preparation method which comprises a step of supporting a first metallocene compound on a support; a step of supporting a cocatalyst on the support on which the first metallocene compound is supported; and a step of supporting a second metallocene compound on the support on which the cocatalyst and the first metallocene compound are supported.

In the above method, the supporting conditions are not particularly limited, and the method can be performed within a range well known to those skilled in the art. For example, the method can proceed by appropriately using high-temperature supporting and low-temperature supporting, and for example, the supporting temperature may range from about −30° C. to about 150° C., preferably from about 50° C. to about 98° C., or from about 55° C. to about 95° C. The supporting time may be appropriately adjusted according to the amount of the first metallocene compound to be supported. Before using the supported catalyst reacted in this way, the reaction solvent may be removed through filtration or distillation under reduced pressure, and alternatively, when needed, the supported additive catalyst can be subjected to Soxhlet filtration using an aromatic hydrocarbon, such as toluene.

Further, the preparation of the supported catalyst can be performed in the presence of a solvent or in the absence of a solvent. When a solvent is used, usable solvents may include an aliphatic hydrocarbon solvent such as hexane or pentane, an aromatic hydrocarbon solvent such as toluene or benzene, a hydrocarbon solvent substituted with a chlorine atom, such as dichloromethane; an ether-based solvent such as diethyl ether or tetrahydrofuran (THF), most organic solvents such as acetone or ethyl acetate. Hexane, heptane, toluene, or dichloromethane is preferred.

In the method for preparing the metallocene compound or the supported catalyst of the present disclosure, the equivalent (eq) means a molar equivalent (eq/mol).

On the other hand, the present disclosure provides a method for preparing polypropylene comprising a step of polymerizing a propylene monomer in the presence of the hybrid supported metallocene catalyst.

The polymerization reaction may be performed by singly polymerizing propylene using a continuous slurry polymerization reactor, a loop slurry reactor, a gas phase reactor or a solution reactor.

And, the polymerization temperature may be about 25° C. to about 500° C., or about 25° C. to about 300° C., or about 30° C. to about 200° C., or about 50° C. to about 150° C., or about 60° C. to about 120° C. Further, the polymerization pressure may be about 1 kgf/cm$^2$ to about 100 kgf/cm$^2$, or about 1 kgf/cm$^2$ to about 50 kgf/cm$^2$, or about 5 kgf/cm$^2$ to about 45 kgf/cm$^2$, or about 10 kgf/cm$^2$ to about 40 kgf/cm$^2$, or about 15 kgf/cm$^2$ to about 35 kgf/cm$^2$.

The supported metallocene catalyst can be injected by dissolving or diluting in an aliphatic hydrocarbon solvent having 5 to 12 carbon atoms, such as pentane, hexane, heptane, nonane, decane, and an isomer thereof, an aromatic hydrocarbon solvent such as toluene and benzene, a hydrocarbon solvent substituted with chlorine atom such as dichloromethane or chlorobenzene. Here, the solvent is preferably used after treating with a small amount of alkylaluminum to remove a small amount of water, air, and the like that function as a catalytic poison, and a cocatalyst can be further used.

In particular, the hybrid supported metallocene catalyst composition according to the present disclosure exhibits high activity in propylene polymerization, and also is useful for the preparation of polypropylene having excellent physical properties, especially improved melt tension through the introduction of long chain branches (LCB) into polypropylene molecules. Specifically, by using the catalyst precursor of Chemical Formula 1 for the synthesis of macromer forming a double bond at the terminal together with the catalyst precursor of Chemical Formula 3 showing high molecular weight properties during propylene polymerization, it has an advantage in securing a high melt tension through the introduction of long chain branches (LCB) into the molecules.

In one example, the polymerization step can be performed by adding hydrogen gas at about 1500 ppm or less, or about 200 ppm to about 1500 ppm, about 1000 ppm or less, or about 250 ppm to about 1000 ppm, or about 850 ppm or less, or about 300 ppm to about 850 ppm based on the propylene monomer content.

In such propylene polymerization step, the transition metal compound of the present disclosure can exhibit high catalytic activity. In one example, the catalyst activity during propylene polymerization may be about 7 kg PP/g·cat·hr or more, or about 7 kg PP/g·cat·hr to about 50 kg PP/g·cat·hr, specifically 7.5 kg PP/g·cat·hr or more, or about 7.5 kg PP/g·cat·hr to about 35 kg PP/g·cat·hr, as calculated by the ratio of the weight (kg PP) of polypropylene produced per the mass (g) of the supported catalyst used relative to the unit time (h).

Further, the polymerization step may be a homopolymerization reaction in which the propylene monomer is solely polymerized.

As described above, the polypropylene according to the present disclosure may be prepared by polymerizing propylene using the supported metallocene catalyst described above.

In this case, the polypropylene prepared may be a homopolymer.

Further, the polypropylene may have a molecular weight distribution (Mw/Mn) of about 4.2 or less, or about 1.5 to about 4.2. Specifically, the molecular weight distribution (Mw/Mn) of the polypropylene may be about 4 or less or about 1.8 to about 4, or about 3.5 or less, or about 2 to about 3.5, or about 3.3 or less, or about 2.7 to about 3.3, or about 3.2 or less, or about 2.9 to about 3.2.

In one example, the molecular weight distribution (Mw/Mn) of the polypropylene can be determined by measuring the weight average molecular weight (Mw) and the number average molecular weight (Mn) of the polymer using a gel permeation chromatography (GPC, manufactured by Waters) and then dividing the weight average molecular weight by the number average molecular weight.

Specifically, Waters PL-GPC220 instrument may be used as the gel permeation chromatography (GPC) instrument, and a Polymer Laboratories PLgel MIX-B 300 mm length column may be used. At this time, the measurement temperature may be 160° C., 1,2,4-trichlorobenzene can be used as a solvent, and the flow rate can be applied at 1 mL/min. Each polypropylene sample may be pretreated by dissolving it in 1,2,4-trichlorobenzene containing 0.0125% BHT at 160° C. for 10 hours using a GPC analyzer (PL-GP220), prepared to a concentration of 10 mg/10 mL, and then supplied in an amount of 200 μL. In addition, the values of Mw and Mn can be derived using a calibration curve formed using a polystyrene standard specimen. 9 kinds of the polystyrene standard specimens are used with the weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

In particular, the polypropylene may have a weight average molecular weight (Mw) of about 100000 g/mol or more, or about 100000 g/mol to about 800000 g/mol, as measured by the method as described above. Specifically, the weight average molecular weight of the polypropylene may be about 150000 g/mol or more, or about 150000 g/mol to about 700000 g/mol, or about 200000 g/mol or more, or about 200000 g/mol to about 800000 g/mol.

The polypropylene of the present disclosure can ensure high melt tension through the introduction of long chain branches (LCB) into polypropylene molecules using a catalyst in which a first metallocene compound and a second metallocene compound having specific substituents and structures are hybrid-supported, as described above. Further, the polypropylene can be produced into products of various melt indices (MFR, MI) according to its application to products.

The polypropylene may have a melting point (Tm) of about 140° C. or more or about 140° C. to about 165° C. Specifically, the melting point (Tm) of the polypropylene may be about 150° C. or more, or about 150° C. to about 160° C., or about 152° C. or more or about 152° C. to about 158° C., or about 153° C. or more, or about 153° C. to about 155° C.

In one example, the melting point (Tm) of the polypropylene may be measured using Differential Scanning calorimeter (DSC, device name: DSC 2920, manufacturer: TA instrument). Specifically, the temperature was increased and the polymer was heated up to 220° C., and then maintained at the same temperature for 5 minutes. After cooling down up to 20° C., the temperature was again increased, and the temperature corresponding to the peak of the DSC (Differential Scanning calorimeter, manufactured by TA) curve is assumed to be the melting point (Tm). At this time, the increasing speed and the lowering speed of the temperature may be applied to 10° C./min, and the melting point is shown by the result measured in the section where the second temperature increases.

Further, the polypropylene may have a melt index ($MI_{2.16}$) of about 0.25 g/10 min to about 150 g/10 min as measured at 230° C. under a load of 2.16 kg according to the American Society for Testing and Materials standard ASTM D 1238. Specifically, the melt index ($MI_{2.16}$) of the polypropylene may be about 1.0 g/10 min to about 60 g/10 min, or about 1.3 g/10 min to about 25 g/10 min, or about 1.5 g/10 min to about 25 g/10 min, or about 1.5 g/10 min to about 15 g/10 min.

Further, the polypropylene may have a pentad sequence distribution measured by 13C-NMR analysis described herein, of about 65 mmmm % or more, or about 65 mmmm % to about 98 mmmm %. Specifically, the pentad sequence distribution of the polypropylene may be about 70 mmmm % or more, or about 70 mmmm % to about 95 mmmm %, or about 72 mmmm % or more, or about 72 mmmm % to about 90 mmmm %.

In one example, the pentad sequence distribution of the polypropylene may be measured using quantitative nuclear magnetic resonance (NMR) spectroscopy as in the paper, V. Busico and R. Cipullo, Progress in Polymer Science, 2001, 26, 443-533. For a specific measurement method, refers to Experimental Example 1 described later.

Specifically, the pentad sequence distribution of polypropylene is measured at the pentad level by $^{13}$C-NMR analysis and is a value expressed as the percentage of isotactic pentad (mmmm) sequences with respect to all pentad sequences. The mmmm % is a value based on moles.

In one example, Bruker's 500 MHz NMR is as a measuring device, polypropylene is dissolved in 1.1.2.2-tetrachloroethane (TCE-$d_2$) solvent, and the pentad sequence distribution of polypropylene is measured at an absolute temperature of 393K ($^{13}$C; pulse sequence=zgig30, ns=4096, $d_1$=10 sec, $^1$H; pulse sequence=zg30, ns=128, $d_1$=3 sec). The pentad sequence distribution is analyzed with reference to the analysis method AMT-3989-0k, and the pentad sequence distribution (mmmm %) is calculated based on the paper, V. Busico and R. Cipullo, Progress in Polymer Science, 2001, 26, 443-533.

Further, the polypropylene may have a melt strength (MS) of about 15 cN or more, for example, about 15 cN to about 150 cN. Specifically, the melt strength of polypropylene may be about 18 cN or more or about 18 cN to about 120 cN, or about 19 cN or more or about 19 cN to about 80 cN, or about 20 cN or more, or about 20 cN to about 50 cN, or about 23 cN or more or about 23 cN to about 50 cN.

In one example, the melt strength (MS) of polypropylene may be measured using a capillary rheometer (manufactured by Gottfert, device name: Rheo-tester 2000). Specifically, a polypropylene sample is connected to Rheotens for a capillary rheometer (Rheo-tester 2000 from Gottfert), a polypropylene pellet resin is placed in a capillary die at a temperature of 200° C., and melted for 5 minutes. Then, the resin that comes out constantly at an extrusion rate of 22 g/min is measured through the Rheotens. The maximum tensile stress until the resulting resin filament breaks is expressed as melt strength. At this time, the capillary die standard is 4 mm in diameter, 25 mm in length and Lo/Do=6.25, the distance from the capillary die to the Rheotens wheel is 80 mm, and the wheel acceleration can be applied at 1.2 cm/sect. For a specific measurement method, refers to Experimental Example 1 described later.

On the other hand, the polypropylene of the present disclosure exhibits high catalytic activity in the polymerization process using a hybrid supported metallocene catalyst in which two or more metallocene compounds having specific substituents and structures are supported on a support as described above, and it can significantly improve the melt strength through the introduction of long chain branches (LCB) into polypropylene molecules. Polypropylene having these properties can be produced into various grades of products in a wide range of application fields depending on hydrogen reactivity.

Advantageous Effects

The hybrid supported metallocene catalyst according to the present disclosure exhibits excellent catalytic activity in propylene polymerization and has an excellent effect of preparing polypropylene having high melt tension through the introduction of long chain branches (LCB) into polypropylene molecules.

DETAILED DESCRIPTION OF THE EMBODIMENTS

Hereinafter, the action and effect of the present disclosure are described in more detail with reference to concrete examples. However, the following examples are provided for illustrative purposes only and the present disclosure is not intended to be limited by these examples.

EXAMPLES

Preparation of Metallocene Compound

Synthesis Example 1

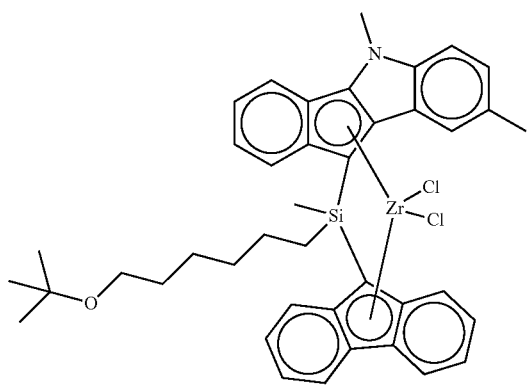

1-1. Preparation of a Ligand Compound 2 g of fluorene was dissolved in 5 mL of methyl tert-butyl ether (MTBE) and 100 mL hexane, then 5.5 mL of n-butyllithium (n-BuLi), 2.5 M solution in hexane was added dropwise in a dry ice/acetone bath, and the solution was stirred at room temperature overnight. 3.6 g of (6-(tert-butoxy)hexyl)dichloro(methyl)silane was dissolved in 50 mL of hexane, the fluorene-Li slurry was transferred thereto for 30 minutes under a dry ice/acetone bath, and the solution was stirred at room temperature overnight. At the same time, 5,8-dimethyl-5,10-dihydroindeno[1,2-b]indole (12 mmol, 2.8 g) was also dissolved in 60 mL of tetrahydrofuran (THF), 5.5 mL of n-BuLi, 2.5 M solution in hexane was added dropwise in a dry ice/acetone bath, and the solution was stirred at room temperature overnight. The reaction solution of fluorene and (6-(tert-butoxy)hexyl)dichloro (methyl)silane was NMR-sampled to confirm the completion of the reaction, and then, the 5,8-dimethyl-5,10-dihydroindeno[1,2-b]indole-Li solution was transferred thereto under a dry ice/acetone bath. The solution was stirred at room temperature overnight. After the reaction, the solution was extracted with ether/water, and the remaining moisture of the organic layer was removed with $MgSO_4$ to obtain a ligand compound (Mw 597.90, 12 mmol), and it was confirmed through 1H-NMR that two isomers were produced.

$^1$H NMR (500 MHz, $d^6$-benzene): −0.30-−0.18 (3H, d), 0.40 (2H, m), 0.65-1.45 (8H, m), 1.12 (9H, d), 2.36-2.40 (3H, d), 3.17 (2H, m), 3.41-3.43 (3H, d), 4.17-4.21 (1H, d), 4.34-4.38 (1H, d), 6.90-7.80 (15H, m).

1-2. Preparation of a Metallocene Compound 7.2 g (12 mmol) of the ligand compound synthesized in 1-1 was dissolved in 50 mL of diethylether, 11.5 mL of n-BuLi, 2.5 M solution in hexane was added dropwise in a dry ice/acetone bath, and the solution was stirred at room temperature overnight. It was vacuum dried to obtain brown sticky oil reaction product, which was then dissolved in toluene to obtain a slurry. $ZrCl_4(THF)_2$ was prepared and 50 mL of toluene was added to prepare a slurry. The 50 mL toluene slurry of $ZrCl_4(THF)_2$ was transferred in a dry ice/acetone bath. By stirring at room temperature overnight, it turned to violet. The reaction solution was filtered to remove LiCl. The filtrate was vacuum dried to remove toluene, and then, hexane was introduced and sonication was conducted for 1 hour. The slurry was filtered to obtain 6 g of filtered solid of a dark violet metallocene compound (Mw 758.02, 7.92 mmol, yield 66 mol %). Two isomers were observed on $^1$H-NMR.

$^1$H NMR (500 MHz, $CDCl_3$): 1.19 (9H, d), 1.71 (3H, d), 1.50-1.70 (4H, m), 1.79 (2H, m), 1.98-2.19 (4H, m), 2.58 (3H, s), 3.38 (2H, m), 3.91 (3H, d), 6.66-7.88 (15H, m).

Synthesis Example 2

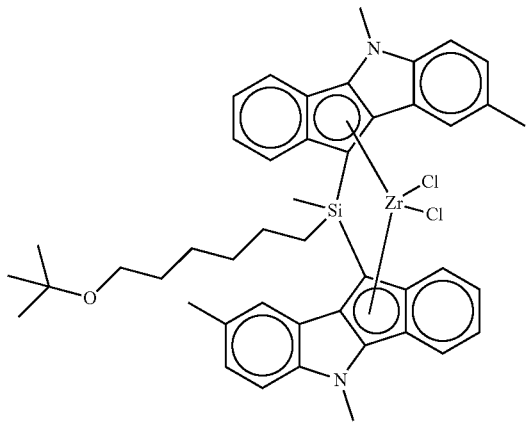

2-1. Preparation of a Ligand Compound

Into a 250 mL flask, 2.63 g (12 mmol) of 5-methyl-5,10-dihydroindeno[1,2-b]indole was introduced, and dissolved in 50 mL of THF, and then, 6 mL of n-BuLi, 2.5M solution in hexane was added dropwise in a dry ice/acetone bath, and the solution was stirred at room temperature overnight. Into another 250 mL flask, 1.62 g (6 mmol) of (6-(tert-butoxy)hexyl)dichloro(methyl)silane was dissolved in 100 mL of hexane, and then, slowly added dropwise to the lithiated solution of 5-methyl-5,10-dihydroindeno[1,2-b]indole under a dry ice/acetone bath, and the solution was stirred at room temperature overnight. After the reaction, the solution was extracted with diethylether/water, and the remaining moisture of the organic layer was removed with MgSO$_4$, and then vacuum dried to obtain 3.82 g (6 mmol) of a ligand compound, and it was confirmed through $^1$H-NMR.

$^1$H NMR (500 MHz, CDCl$_3$): −0.33 (3H, m), 0.86-1.53 (10H, m), 1.16 (9H, d), 3.18 (2H, m), 4.07 (3H, d), 4.12 (3H, d), 4.17 (1H, d), 4.25 (1H, d), 6.95-7.92 (16H, m).

2-2. Preparation of a Metallocene Compound 3.82 g (6 mmol) of the ligand compound synthesized in 2-1 was dissolved in 100 mL of toluene and 5 mL of MTBE, and then, 5.6 mL (14 mmol) of n-BuLi, 2.5M solution in hexane was added dropwise in a dry ice/acetone bath, and the solution was stirred at room temperature overnight. Into another flask, 2.26 g (6 mmol) of ZrCl$_4$(THF)$_2$ was prepared, and 100 ml of toluene was introduced to prepare a slurry. The toluene slurry of ZrCl$_4$(THF)$_2$ was transferred to the lithigated ligand in a dry ice/acetone bath. The solution was stirred at room temperature overnight, and then, it turned to a violet color. The reaction solution was filtered to remove LiCl, and then, the obtained filtrate was vacuum dried, hexane was added, and sonication was conducted. The slurry was filtered to obtain 3.40 g of the filtered solid of a dark violet metallocene compound (yield 71.1 mol %).

$^1$H NMR (500 MHz, CDCl$_3$): 1.74 (3H, d), 0.85-2.33 (10H, m), 1.29 (9H, d), 3.87 (3H, s), 3.92 (3H, s), 3.36 (2H, m), 6.48-8.10 (16H, m).

Synthesis Example 3

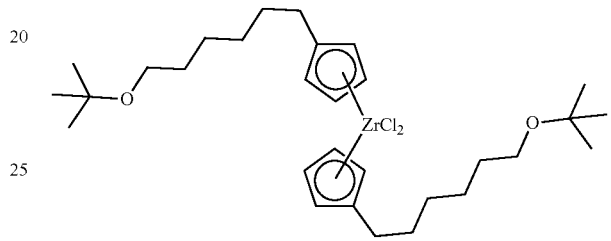

3-1. Preparation of a Ligand Compound tert-Butyl-O—(CH$_2$)$_6$—Cl was prepared using 6-chlorohexanol according to the method described in the literature (Tetrahedron Lett., 2951, 1988), and cyclopentadienyl sodium (NaC$_5$H$_5$) was reacted therewith to obtain a ligand compound, tert-Butyl-O—(CH$_2$)$_6$—C$_5$H$_5$ (yield 60%, bp 80° C./0.1 mmHg).

3-2. Preparation of a Metallocene Compound

Additionally, the ligand compound prepared in 3-1, t-Butyl-O—(CH$_2$)$_6$—C$_5$H$_5$, was dissolved in THF at −78° C., n-butyllithium (n-BuLi) was slowly added thereto, and then the temperature was raised to room temperature, and the mixture was reacted for 8 hours. The lithium salt solution was again slowly added to a suspension solution of ZrCl$_4$(THF)$_2$ (1.70 g, 4.50 mmol)/THF (30 mL) at −78° C., and further reacted at room temperature for 6 hours.

After completion of the reaction, all volatile substances were vacuum dried, and a hexane solvent was added to the obtained oily liquid substances and filtered. After the filtered solution was vacuum dried, hexane was added thereto, and a precipitate was induced at a low temperature (−20° C.). The obtained precipitate was filtered at low temperature to obtain [tert-Butyl-O—(CH$_2$)$_6$—C$_5$H$_4$]$_2$ZrCl$_2$ compound as a white solid (yield 92%).

Preparation of a Second Metallocene Compound

Synthesis Example 4

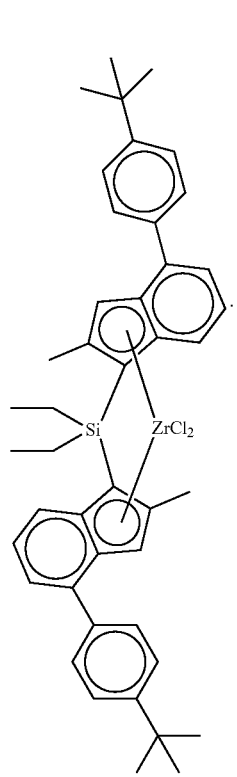

4-1. Preparation of a Ligand Compound

2-Methyl-4-tert-butyl-phenylindene (20.0 g) was dissolved in toluene/THF=10/1 solution (volume ratio, 220 mL), and then n-butyllithium solution (2.5 M, hexane solvent, 22.2 g) was slowly added dropwise at 0° C., and then stirred at room temperature for one day. Then, diethyldichlorosilane (6.2 g) was slowly added dropwise to the mixed solution at −78 degrees Celsius (° C.), stirred for about 10 minutes, and then stirred at room temperature for one day. Then, water was added to separate the organic layer, and then the solvent was distilled under reduced pressure to obtain a ligand compound, bis(2-methyl-4-(4'-tert-butyl-phenyl)indenyl)diethylsilane.

4-2. Preparation of a Metallocene Compound

The ligand compound prepared in 4-1 was dissolved in toluene/THF=5/1 solution (120 mL), and then n-butyllithium solution (2.5 M, hexane solvent, 22.2 g) was slowly added dropwise at −78° C. Then, the solution was stirred at room temperature for one day. To the reaction solution, zirconium chloride (8.9 g) was diluted in toluene (20 mL), and then slowly added dropwise at −78° C., and stirred at room temperature for one day. The solvent of the reaction solution was removed under reduced pressure, dichloromethane was added, filtered, and the filtrate was removed by vacuum distillation. The result was recrystallized using toluene and hexane to obtain high purity rac-[(diethylsilane-diyl)-bis((2-methyl-4-(4'-tert-butyl-phenyl)indenyl)]zirconium dichloride (10.1 g, 34%, rac:meso=20:1).

Synthesis Example 5

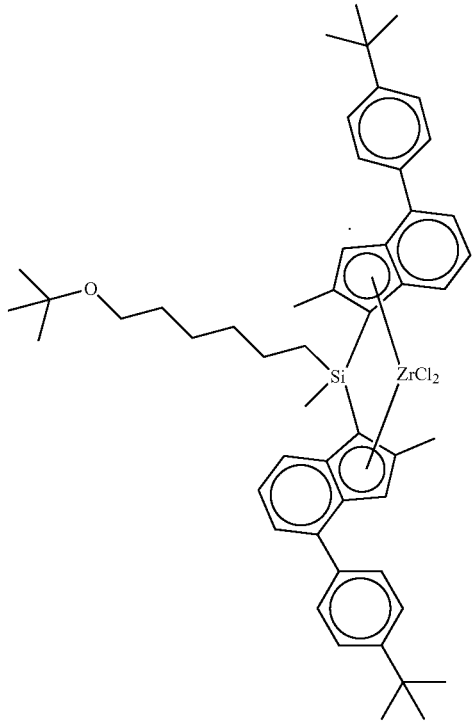

5-1. Preparation of a Ligand Compound

2-Methyl-4-(t-butyl)phenylindene (1 eq) was dissolved in toluene/THF=10/1 solution (volume ratio, 0.5 M), and then n-BuLi (2.1 eq) was slowly added dropwise at −25° C., and the solution was stirred at room temperature for 3 hours. Then, CuCN (2 mol %) was added and stirred for 30 minutes, and then dichloro (6-(tert-butoxy)hexylmethyl silane (0.53 eq) was added at −10° C., and then stirred at room temperature overnight. Then, the reaction was worked-up using water, and dried to obtain a ligand compound, bis(2-methyl-4-tert-butyl-phenylindenyl)$_6$-(tert-butoxy)hexylmethylsilane.

5-2. Preparation of a Metallocene Compound

The ligand compound prepared in 5-1 was dissolved in toluene/diethyl ether=2/1 solution (volume ratio, 0.53 M), n-BuLi (2.05 eq) was added at −25° C., and then the solution was stirred at room temperature for 5 hours. Into a flask, ZrCl$_4$ (1 eq) was prepared and toluene (0.17 M) was introduced to prepare a slurry, which was then stirred at room temperature overnight.

When the reaction was completed, the solvent was vacuum dried, dichloromethane (DCM) was introduced again, and LiCl was removed through a filter or the like. The filtrate was vacuum dried, recrystallized using hexane/DCM, and then the resulting solid was filtered and vacuum dried to obtain a solid metallocene compound, (6-(tert-butoxy)hexylmethyl-silanediylbis(4-(4'-(tert-butyl)phenyl)-2-methyl-1H-inden-1-yl)zirconium dichloride.

Synthesis Example 6

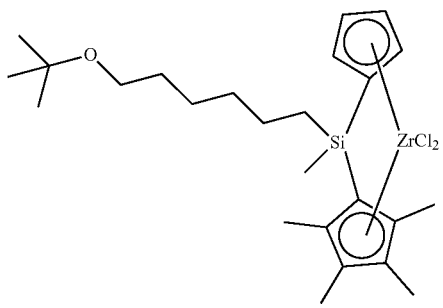

6-1. Preparation of a Ligand Compound

1 Equivalent of tetramethylcyclopentadiene (TMCP) was dissolved in tetrahydrofuran at −78° C., n-BuLi (1 eq) was slowly added dropwise, and then heated to room temperature, and allowed to react for 8 hours. Then, the reaction solution was added dropwise to a flask containing 1 equivalent of (6-tert-butoxyhexyl)dichloromethylsilane at −78° C., and the solution was stirred at room temperature overnight. At the same time, into another flask, 1 equivalent of cyclopentadiene (CP) was dissolved in tetrahydrofuran at −78° C., n-BuLi (1 eq) was slowly added dropwise, and then heated to room temperature and stirred overnight. The TMCP reaction mixture was added dropwise into a flask containing the CP reaction mixture at −78° C., heated to room temperature, and stirred overnight to obtain a ligand.

6-2. Preparation of a Metallocene Compound

2 Equivalents of n-BuLi were slowly added dropwise to the ligand mixture prepared in 6-1 at −78° C., and then the temperature was raised to room temperature, and then the solution was stirred for 8 hours or more, slowly added dropwise into a flask containing $ZrCl_4(THF)_2$ and stirred overnight. All solvents were vacuum dried, and a hexane solvent was added to the obtained oily liquid substance and then recrystallized to obtain a solid.

Preparation of Supported Catalyst

Preparation Example 1: Preparation of a Hybrid Supported Metallocene Catalyst 100 mL of a toluene solution was added to a SUS autoclave, and the reactor temperature was maintained at 40° C. 10 g of silica (SP2408HT) was dehydrated by applying vacuum for 12 hours at a temperature of 600° C., and then added to a 500 L reactor and then 12 mmol of methylaluminoxane (MAO) was added and reacted at 95° C. for 12 hours. Then, 30 μmol of the first metallocene compound prepared in Synthesis Example 1 was dissolved in toluene, and then added thereto. The solution was stirred at 50° C. at 200 rpm and allowed to react for 2 hours.

After completion of the reaction, 60 μmol of the second metallocene compound prepared in Synthesis Example 4 was dissolved in toluene, and then stirred at 50° C. at 200 rpm and allowed to react for 2 hours.

After completion of the reaction, the stirring was stopped and the mixture was washed with a sufficient amount of toluene, then 50 mL of toluene was added again and stirred for 10 minutes, then the stirring was stopped and the mixture was washed with a sufficient amount of toluene to remove compounds not participated in the reaction. Then, 50 mL of hexane was added and stirred, and a hexane slurry was transferred to a filter and filtered.

A primary drying was performed at room temperature for 5 hours under reduced pressure, and a secondary drying was performed at 40° C. for 4 hours under reduced pressure to obtain a hybrid supported catalyst.

Preparation Example 2: Preparation of a Hybrid Supported Metallocene Catalyst A hybrid supported metallocene catalyst was prepared using the same method as in Preparation Example 1, except that 15 μmol of the metallocene compound prepared in Synthesis Example 1 was added, and 75 μmol of the metallocene compound prepared in Synthesis Example 4 was added.

Preparation Example 3: Preparation of a Hybrid Supported Metallocene Catalyst A hybrid supported metallocene catalyst was prepared using the same method as in Preparation Example 1, except that the metallocene compound prepared in Synthesis Example 2 was used instead of the first metallocene compound prepared in Synthesis Example 1.

Preparation Example 4: Preparation of a Hybrid Supported Metallocene Catalyst A hybrid supported metallocene catalyst was prepared using the same method as in Preparation Example 2, except that the metallocene compound prepared in Synthesis Example 2 was used instead of the first metallocene compound prepared in Synthesis Example 1.

Comparative Preparation Example 1: Preparation of a Solely Supported Metallocene Catalyst 100 mL of a toluene solution was added to a SUS autoclave, and the reactor temperature was maintained at 40° C. 10 g of silica (SP2408HT) was dehydrated by applying vacuum for 12 hours at a temperature of 600° C., and then added to a 500 L reactor and then 12 mmol of methylaluminoxane (MAO) was added and reacted at 95° C. for 12 hours. Then, 90 μmol of the second metallocene compound prepared in Synthesis Example 4 was dissolved in toluene, and then added thereto. The solution was stirred at 50° C. at 200 rpm and allowed to react for 2 hours.

After completion of the reaction, the stirring was stopped and the mixture was washed with a sufficient amount of toluene, then 50 mL of toluene was added again and stirred for 10 minutes, then the stirring was stopped and the mixture was washed with a sufficient amount of toluene to remove compounds not participated in the reaction. Then, 50 mL of hexane was added and stirred, and then a hexane slurry was transferred to a filter and filtered.

A primary drying was performed at room temperature for 5 hours under reduced pressure, and a secondary drying was performed at 40° C. for 4 hours under reduced pressure to obtain a solely supported catalyst.

Comparative Preparation Example 2: Preparation of a Solely Supported Metallocene Catalyst A solely supported metallocene catalyst was prepared using the same method as in Comparative Preparation Example 1, except that the first metallocene compound prepared in Synthesis Example 1 was used instead of the second metallocene compound prepared in Synthesis Example 4.

Comparative Preparation Example 3: Preparation of a Solely Supported Metallocene Catalyst A solely supported metallocene catalyst was prepared using the same method as in Comparative Preparation Example 1, except that the first metallocene compound prepared in Synthesis Example 2 was used instead of the second metallocene compound prepared in Synthesis Example 4.

Comparative Preparation Example 4: Preparation of a Hybrid Supported Metallocene Catalyst A hybrid supported metallocene catalyst was prepared using the same method as in Preparation Example 1, except that the first metallocene compound prepared in Synthesis Example 3 was used instead of the first metallocene compound prepared in Synthesis Example 1.

Comparative Preparation Example 5: Preparation of a Hybrid Supported Metallocene Catalyst A hybrid supported metallocene catalyst was prepared using the same method as in Preparation Example 2, except that the first metallocene compound prepared in Synthesis Example 3 was used instead of the first metallocene compound prepared in Synthesis Example 1.

Comparative Preparation Example 6: Preparation of a Hybrid Supported Metallocene Catalyst A hybrid supported metallocene catalyst was prepared using the same method as in Preparation Example 1, except that the second metallocene compound prepared in Synthesis Example 5 was used instead of the second metallocene compound prepared in Synthesis Example 4.

Comparative Preparation Example 7: Preparation of a Hybrid Supported Metallocene Catalyst A hybrid supported metallocene catalyst was prepared using the same method as in Preparation Example 2, except that the second metallocene compound prepared in Synthesis Example 5 was used instead of the second metallocene compound prepared in Synthesis Example 4.

Comparative Preparation Example 8: Preparation of a Hybrid Supported Metallocene Catalyst A hybrid supported metallocene catalyst was prepared using the same method as in Preparation Example 1, except that the second metallocene compound prepared in Synthesis Example 6 was used instead of the second metallocene compound prepared in Synthesis Example 4.

Comparative Preparation Example 9: Preparation of a Hybrid Supported Metallocene Catalyst A hybrid supported metallocene catalyst was prepared using the same method as in Preparation Example 2, except that the second metallocene compound prepared in Synthesis Example 6 was used instead of the second metallocene compound prepared in Synthesis Example 4.

Polypropylene Polymerization

Example 1

A 2 L stainless reactor was vacuum dried at 65° C., and then cooled, to which 3 mL of triethylaluminum was added at room temperature, 820 ppm of hydrogen gas was added, and then 1.5 L of propylene was added. At this time, the addition amount of hydrogen gas is a numerical value based on the propylene monomer content.

After stirring for 10 minutes, 30 mg of the hybrid supported metallocene catalyst of Preparation Example 1 and 20 mL of a hexane slurry were prepared at 20° C., and then added to a reactor under argon (Ar) conditions. The reactor temperature was slowly raised up to 70° C., and then the homopolymerization process of propylene was performed under a pressure condition of 30 bar for 1 hour, and unreacted propylene was vented.

Examples 2 to 4

Homopolypropylene was prepared using the same method as in Example 1, except that the hybrid supported metallocene catalysts prepared in Preparation Examples 2 to 4 were respectively used instead of the hybrid supported metallocene catalyst prepared in Preparation Example 1.

Comparative Examples 1 to 9

Homopolypropylene was prepared using the same method as in Example 1, except that the solely supported catalysts prepared in Comparative Preparation Examples 1 to 3 or the hybrid supported catalysts prepared in Comparative Preparation Examples 4 to 9 were respectively used instead of the hybrid supported metallocene catalyst prepared in Preparation Example 1.

Test Example: Evaluation of Physical Properties of Polypropylene

Together with the activities of the metallocene catalysts used respectively in the polymerization process according to the Examples and Comparative Examples, the physical properties of the homopolypropylene prepared using the supported catalyst were evaluated by the following methods. The results are shown in Table 1 below.

(1) Activity (kg PP/g·cat·hr)

The activity was calculated by the ratio of the weight (kg PP) of the homopolypropylene produced per mass (g) of the supported catalyst used relative to the unit time (h).

(2) Melt Index ($MI_{2.16}$)

It was measured at 230° C. under a load of 2.16 kg according to the American Society for Testing and Materials standard ASTM D 1238, and expressed as the weight (g) of the polymer melted out for 10 minutes.

(3) Melting Point (Tm)

The melting point (Tm) of the polypropylene was measured using Differential Scanning calorimeter (DSC, device name: DSC 2920, manufacturer: TA instrument). Specifically, the temperature was increased and the polymer was heated up to 220° C., and then maintained at the same temperature for 5 minutes. After cooling down up to 20° C., the temperature was again increased, and the temperature corresponding to the peak of the DSC (Differential Scanning calorimeter, manufactured by TA) curve was assumed to be the melting point. At this time, the increasing speed and the lowering speed of the temperature were 10° C./min, and the result measured in the section where the second temperature increased was used as the melting point.

(4) Weight Average Molecular Weight (Mw, g/Mol) and Molecular Weight Distribution (MWD, Polydispersity Index)

The molecular weight distribution (Mw/Mn) was calculated by measuring the weight average molecular weight (Mw) and the number average molecular weight (Mn) of the polymer using a gel permeation chromatography (GPC, manufactured by Waters) and then dividing the weight average molecular weight by the number average molecular weight.

Specifically, Waters PL-GPC220 instrument was used as the gel permeation chromatography (GPC) instrument, and a Polymer Laboratories PLgel MIX-B 300 mm length column was used. At this time, the measurement temperature was 160° C., 1,2,4-trichlorobenzene was used as a solvent, and the flow rate was 1 mL/min. Each polypropylene sample was pretreated by dissolving it in 1,2,4-trichlorobenzene containing 0.0125% BHT at 160° C. for 10 hours using a GPC analyzer (PL-GP220), prepared to a concentration of 10 mg/10 mL, and then supplied in an amount of 200 µL. The values of Mw and Mn were derived using a calibration curve formed using a polystyrene standard specimen. 9 kinds of the polystyrene standard specimens were used with the weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

(5) Pentad Sequence Distribution

The pentad sequence distribution of a polypropylene polymer was measured using quantitative nuclear magnetic resonance (NMR) spectroscopy as in the paper, V. Busico and R. Cipullo, Progress in Polymer Science, 2001, 26, 443-533.

Specifically, the pentad sequence distributions of the homopolypropylene of Examples and Comparative Examples were measured at the pentad level by $^{13}$C-NMR analysis and were expressed as the percentage of isotactic pentad (mmmm) sequences with respect to all pentad sequences. The mmmm % is a value based on moles.

At this time, Bruker's 500 MHz NMR was used as a measuring device, polypropylene was dissolved in 1.1.2.2-tetrachloroethane (TCE-d2) solvent and the measurement was performed at an absolute temperature of 393K ($^{13}$C; pulse sequence=zgig30, ns=4096, $d_1$=10 sec, $^1$H; pulse sequence=zg30, ns=128, $d_1$=3 sec). The sequence distribution was analyzed with reference to the analysis method AMT-3989-0k, and the pentad sequence distribution (mmmm %) was calculated based on the paper, V. Busico and R. Cipullo, Progress in Polymer Science, 2001, 26, 443-533.

(6) Melt Strength (MS)

A polypropylene polymer sample was connected to Rheotens of a capillary rheometer (Rheo-tester 2000 from Gottfert), and the measurement was performed five times under the following conditions, and then the average value was taken.

Sample specifications: Propylene polymer pellet resin was placed in a capillary die at a temperature of 200° C., melted for 5 minutes, and then the resin that came out constantly at an extrusion rate of 22 g/min was measured through the Rheotens. The maximum tensile stress until the resulting resin filament breaks was expressed as melt strength.

the capillary die standard is 4 mm in diameter, 25 mm in length, Lo/Do=6.25 the distance from the capillary die to the Rheotens wheel: 80 mm the wheel acceleration: 1.2 cm/sect.

TABLE 1

| | Catalyst | Molar ratio of hybrid supported catalyst precursors * | Activity (kg PP/g Cat · hr) | $MI_{2.16}$ (g/10 min) | Tm (C) | MWD | Pentad sequence distribution (mmmm, %) | MS (cN) |
|---|---|---|---|---|---|---|---|---|
| Example 1 | Preparation Example 1 | 1:2 | 11.4 | 1.8 | 154 | 2.9 | 82.9 | 49 |
| Example 2 | Preparation Example 2 | 1:5 | 12.3 | 1.3 | 155 | 2.9 | 89.1 | 40 |
| Example 3 | Preparation Example 3 | 1:2 | 7.6 | 10.4 | 153 | 3.1 | 72.8 | 25 |
| Example 4 | Preparation Example 4 | 1:5 | 9.1 | 8.7 | 153 | 3.2 | 77.6 | 23 |
| Comparative Example 1 | Comparative Preparation Example 1 | Solely supported | 13.0 | 3.4 | 155 | 2.4 | 98 | 8 |
| Comparative Example 2** | Comparative Preparation Example 2 | Solely supported | 2.2 | Unmeasurable | Unmeasurable | 2.6 | 8.1 | Unmeasurable |
| Comparative Example 3** | Comparative Preparation Example 3 | Solely supported | 1.0 | Unmeasurable | Unmeasurable | 3.3 | 4.7 | Unmeasurable |
| Comparative Example 4 | Comparative Preparation Example 4 | 1:2 | 5.8 | 6.8 | 155 | 4.5 | 70.1 | 2 |

TABLE 1-continued

| Catalyst | | Molar ratio of hybrid supported catalyst precursors * | Activity (kg PP/g Cat · hr) | MI$_{2.16}$ (g/10 min) | Tm (C) | MWD | Pentad sequence distribution (mmmm, %) | MS (cN) |
|---|---|---|---|---|---|---|---|---|
| Comparative Example 5 | Comparative Preparation Example 5 | 1:5 | 7.1 | 5.3 | 155 | 3.8 | 82.5 | 5 |
| Comparative Example 6 | Comparative Preparation Example 6 | 1:2 | 13.5 | 50.8 | 150 | 3.4 | 88.1 | 10 |
| Comparative Example 7 | Comparative Preparation Example 7 | 1:5 | 14.8 | 44.2 | 151 | 3.4 | 90.3 | 11 |
| Comparative Example 8** | Comparative Preparation Example 8 | 1:2 | 13.5 | Unmeasurable | Unmeasurable | 5.1 | 5.1 | Unmeasurable |
| Comparative Example 9** | Comparative Preparation Example 9 | 1:5 | 14.8 | Unmeasurable | Unmeasurable | 5.3 | 5.4 | Unmeasurable |

\* The molar ratio of the catalyst precursors is expressed as a molar ratio of the first metallocene compound: the second metallocene compound.
\*\*Comparative Examples 2, 3, 8, and 9 showed that the polymer was in a highly sticky form, making it impossible to evaluate the physical properties (atatic polypropylene)

Referring to Table 1, it can be confirmed that Examples 1 to 4 using the hybrid supported metallocene catalysts of Preparation Examples 1 to 4 according to an embodiment of the present disclosure exhibit high activity in propylene polymerization, and can prepare homopolypropylene with improved melt tension through the introduction of long chain branches (LCB) into polypropylene molecules together with a narrow molecular weight distribution.

The invention claimed is:

1. A hybrid supported metallocene catalyst comprising at least one first metallocene compound selected from compounds represented by Chemical Formula 1; at least one second metallocene compound selected from compounds represented by Chemical Formula 3; at least one cocatalyst selected from the group consisting of compounds represented by Chemical Formulas 4 to 6; and a support for supporting the first and second metallocene compounds:

[Chemical Formula 1]

in Chemical Formula 1, $M_1$ is a Group 4 transition metal;

$A_1$ is silicon;

$Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{7-40}$ aryloxyalkyl, $C_{6-40}$ aryl, $C_{7-40}$ alkylaryl, or $C_{7-40}$ arylalkyl;

$X_1$ and $X_2$ are the same as or different from each other, and are each independently halogen, $C_{1-20}$ alkyl, $C_{2-20}$ alkenyl, $C_{6-40}$ aryl, a nitro group, an amido group, $C_{1-20}$ alkylsilyl, $C_{1-20}$ alkoxy, or $C_{1-20}$ sulfonate group; and $C_1$ and $C_2$ are the same as or different from each other, and are each independently represented by either Chemical Formula 2a or Chemical Formula 2b, provided that the case where both $C_1$ and $C_2$ are Chemical Formula 2b is excluded;

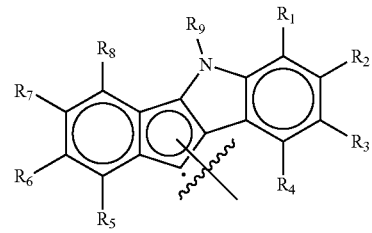

[Chemical Formula 2a]

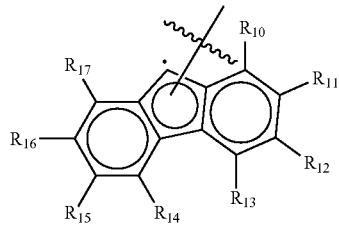

[Chemical Formula 2b]

in Chemical Formulae 2a and 2b, $R_1$ to $R_{17}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-40}$ aryl, $C_{7-40}$ alkylaryl, or $C_{7-40}$ arylalkyl; or two or more neighboring groups of the $R_{10}$ to $R_{17}$ are connected to each other to form a substituted or unsubstituted aliphatic or aromatic ring;

· represents a site for binding to $A_1$; and ⸺ represents a site for binding to $M_1$,

[Chemical Formula 3]

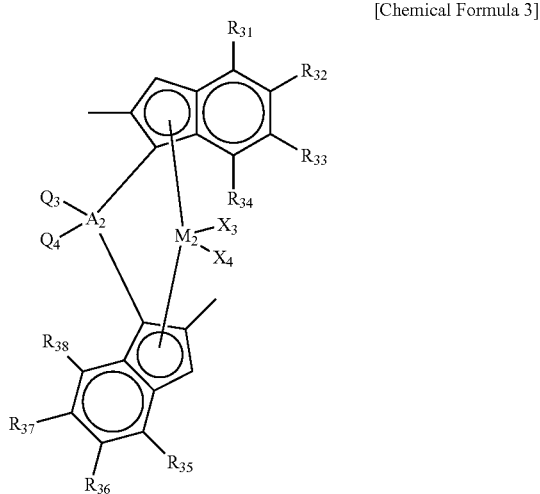

in Chemical Formula 3,
$M_2$ is a Group 4 transition metal;
$A_2$ is carbon, silicon, or germanium;
$X_3$ and $X_4$ are the same as or different from each other and are each independently halogen;
$R_{31}$ and $R_{35}$ are the same as or different from each other, and are each independently phenyl substituted with $C_{3-6}$ branched alkyl;
$R_{32}$ to $R_{34}$ and $R_{36}$ to $R_{38}$ are the same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-40}$ aryl, $C_{7-20}$ alkylaryl, or $C_{7-20}$ arylalkyl, and
$Q_3$ and $Q_4$ are the same as each other and are each $C_{2-4}$ linear alkyl, $$-[Al(R_{41})-O]_c- \quad \text{[Chemical Formula 4]}$$

in Chemical Formula 4,
each $R_{41}$ is independently halogen, $C_{1-20}$ alkyl or $C_{1-20}$ haloalkyl; and
$c$ is an integer of 2 or more, $$D(R_{51})_3 \quad \text{[Chemical Formula 5]}$$

in Chemical Formula 5,
D is aluminum or boron; and
each $R_{51}$ is independently hydrogen, halogen, $C_{1-20}$ hydrocarbyl or halogen-substituted $C_{1-20}$ hydrocarbyl, $$[L-H]^+[Q(E)_4]^- \text{ or } [L]^+[Q(E)_4]^- \quad \text{[Chemical Formula 6]}$$

in Chemical Formula 6,
L is a neutral or cationic Lewis base;
$[L-H]^+$ is a Bronsted acid;
Q is $B^{3+}$ or $Al^{3+}$; and
each E is independently $C_{6-40}$ aryl or $C_{1-20}$ alkyl, wherein the $C_{6-40}$ aryl or the $C_{1-20}$ alkyl is unsubstituted or substituted one or more substituents selected from the group consisting of halogen, $C_{1-20}$ alkyl, $C_{1-20}$ alkoxy, and $C_{6-40}$ aryloxy,
wherein the first metallocene compound and the second metallocene compound are supported in a molar ratio of 1:2 to 1:5.

2. The hybrid supported metallocene catalyst of claim 1, wherein the first metallocene compound is any one of compounds represented by Chemical Formula 1-1 or Chemical Formula 1-2;

[Chemical Formula 1-1]

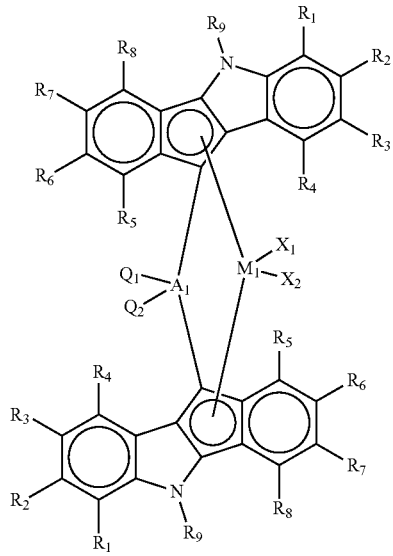

[Chemical Formula 1-2]

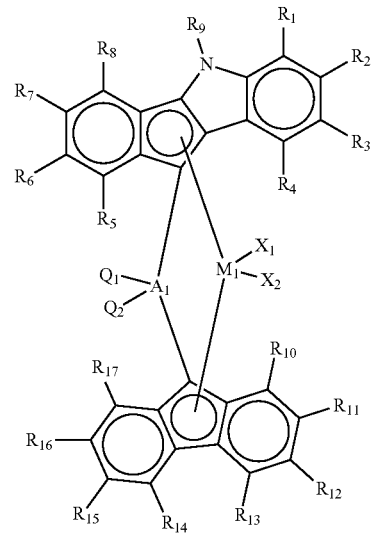

in Chemical Formulae 1-1 and 1-2,
$Q_1$, $Q_2$, $A_1$, $M_1$, $X_1$, $X_2$, $R_1$ to $R_{17}$ are as defined in Chemical Formulae 1.

3. The hybrid supported metallocene catalyst of claim 1, wherein $Q_1$ and $Q_2$ are the same as or different from each other, and each independently $C_{1-3}$ alkyl, or $C_{2-12}$ alkoxyalkyl, $X_1$ and $X_2$ are the same as or different from each other, and each independently halogen, and $M_1$ is zirconium or hafnium.

4. The hybrid supported metallocene catalyst of claim 1, wherein $R_1$ to $R_9$ are the same as or different from each other, and each independently hydrogen, halogen, $C_{1-12}$ linear or branched alkyl, $C_{1-12}$ linear or branched alkoxy, or $C_{6-20}$ aryl.

5. The hybrid supported metallocene catalyst of claim 1, wherein $R_3$ is hydrogen, halogen, $C_{1-6}$ linear or branched alkyl, or $C_{1-6}$ linear or branched alkoxy.

6. The hybrid supported metallocene catalyst of claim 1, wherein $R_9$ is $C_{1-6}$ linear or branched alkyl, or $C_{6-20}$ aryl.

7. The hybrid supported metallocene catalyst of claim 1, wherein $R_{10}$ to $R_{17}$ are the same as or different from each other, and each independently hydrogen, or $C_{1-12}$ linear or branched alkyl; or two or more neighboring groups of $R_{10}$ to $R_{17}$ are connected to each other to form $C_{6-20}$ aliphatic or aromatic ring, which is substituted with at least one $C_{1-3}$ alkyl.

8. The hybrid supported metallocene catalyst of claim 1, wherein the first metallocene compound is any one of compounds represented by the following structural formulas:

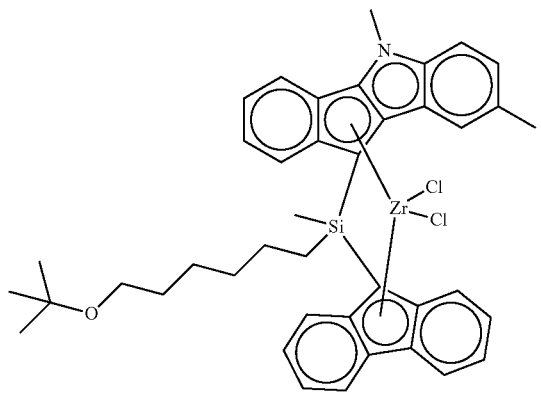

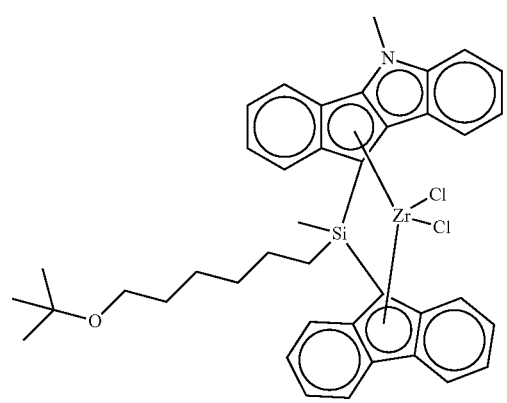

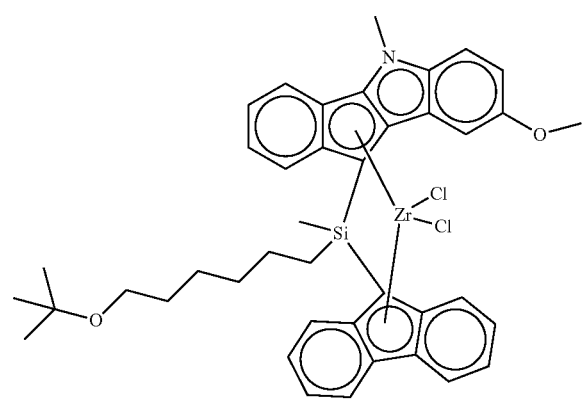

-continued

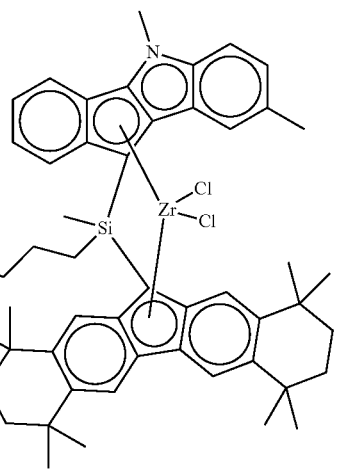

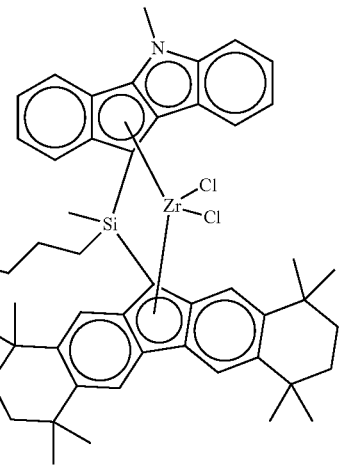

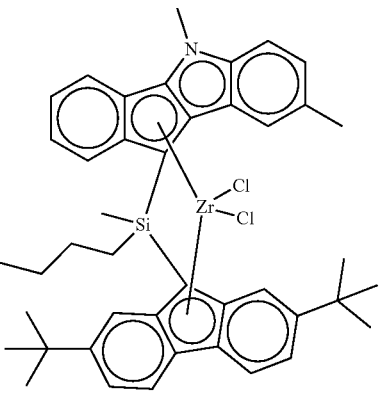

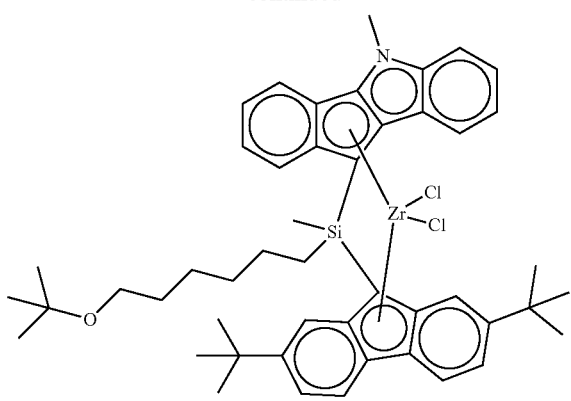
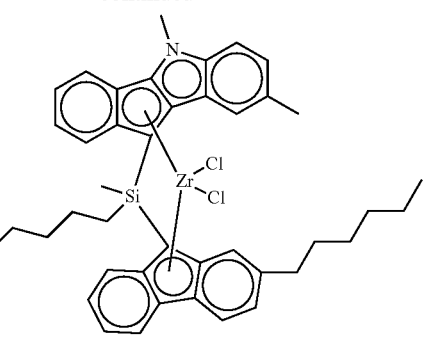
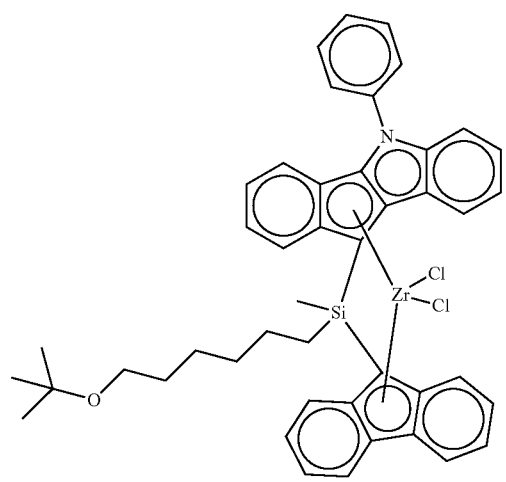
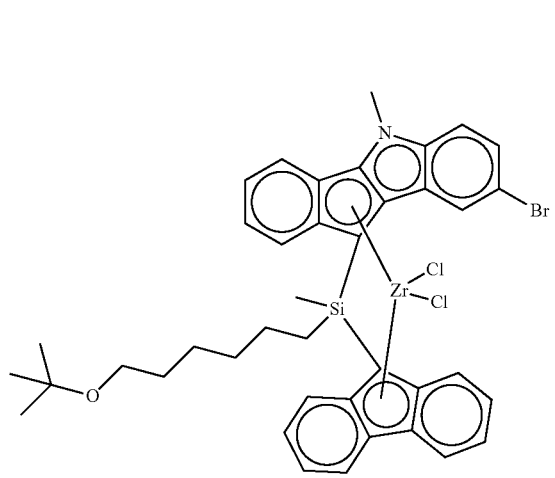
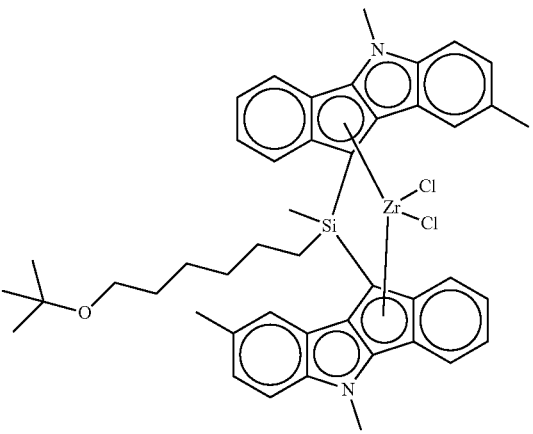

-continued

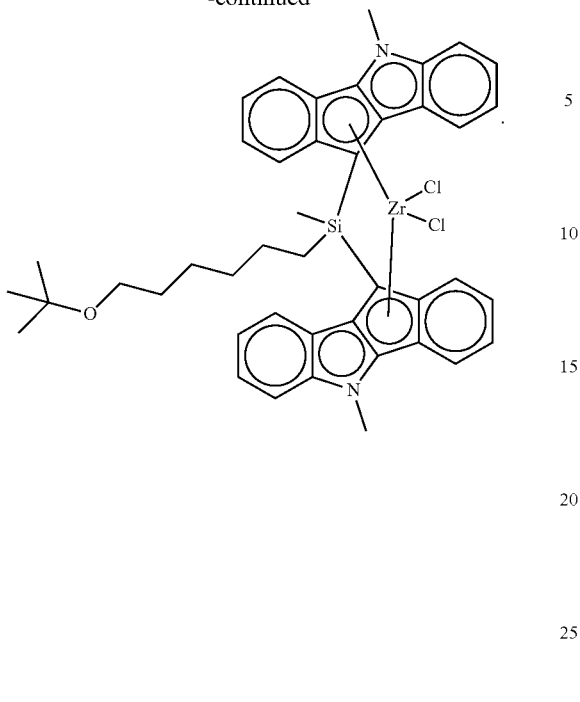

9. The hybrid supported metallocene catalyst of claim 1, wherein $X_3$ and $X_4$ are the same as or different from each other, and each independently halogen, $A_2$ is silicon, and $M_2$ is zirconium or hafnium.

10. The hybrid supported metallocene catalyst of claim 1, wherein $R_{31}$ and $R_{35}$ are each tert-butyl phenyl.

11. The hybrid supported metallocene catalyst of claim 1, wherein both $Q_3$ and $Q_4$ are ethyl.

12. The hybrid supported metallocene catalyst of claim 1, wherein the second metallocene compound is a compound represented by the following structural formula:

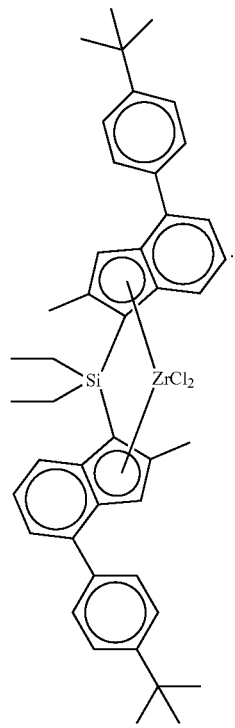

13. A method for preparing polypropylene, comprising a step of polymerizing a propylene monomer in the presence of the hybrid supported metallocene catalyst of claim 1.

14. The method of claim 13, wherein the polypropylene is a homopolymer.

15. The method of claim 13, wherein the polypropylene has a pentad sequence distribution measured by 13C-NMR analysis of 65 mmmm % or more.

16. The method of claim 13, wherein the polypropylene has a melt strength (MS) of 15 cN or more.

17. The method of claim 13, wherein the polypropylene has a molecular weight distribution (Mw/Mn) of 3.3 or less, melting point (Tm) of 150° C. or more, and a melt index ($MI_{2.16}$) of 1.0 g/10 min to 150 g/10 min as measured at 230° C. under a load of 2.16 kg according to ASTM D 1238.

* * * * *